(12) United States Patent
Chan et al.

(10) Patent No.: US 12,530,111 B2
(45) Date of Patent: Jan. 20, 2026

(54) SYNTHESIZING VIRTUAL SPACE DATA

(71) Applicant: Salesforce, Inc., San Francisco, CA (US)

(72) Inventors: Melissa Aubrie Chan, San Francisco, CA (US); Anissa Cristerna, Chicago, IL (US); Adam Marinelli, Toronto (CA)

(73) Assignee: Salesforce, Inc., San Francisco, CA (US)

( * ) Notice: Subject to any disclaimer, the term of this patent is extended or adjusted under 35 U.S.C. 154(b) by 176 days.

(21) Appl. No.: 18/429,299

(22) Filed: Jan. 31, 2024

(65) Prior Publication Data

US 2025/0085836 A1   Mar. 13, 2025

Related U.S. Application Data

(60) Provisional application No. 63/537,758, filed on Sep. 11, 2023.

(51) Int. Cl.
*G06F 3/04842* (2022.01)
*G06F 40/166* (2020.01)
(Continued)

(52) U.S. Cl.
CPC ........ *G06F 3/04842* (2013.01); *G06F 40/166* (2020.01); *G06F 40/40* (2020.01);
(Continued)

(58) Field of Classification Search
CPC .... G06F 3/04842; G06F 40/166; G06F 40/40; G06F 40/03; G06N 20/00; G06T 19/00;
(Continued)

(56) References Cited

U.S. PATENT DOCUMENTS 10,388,272 B1   8/2019   Thomson et al.
10,573,312 B1   2/2020   Thomson et al.
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

(Continued)

*Primary Examiner* — Phuong H Nguyen
(74) *Attorney, Agent, or Firm* — Lee & Hayes, P.C.

(57) ABSTRACT

Techniques for generating synthesized data within a virtual space are discussed herein. A communication platform may receive a request from a user profile of a communication platform. The request may include one or more instructions for the communication platform to send a survey to one or more user profiles to provide data (e.g., feedback) to the virtual space. Based on sending the request for feedback to the user profiles, the communication platform may receive feedback from the user profiles. Upon receiving such feedback, the communication platform may receive a request from a user profile synthesize the data. Upon receiving the request to synthesize the feedback, the communication platform may input the user feedback into a machine-learning model trained to output synthesized data. The communication platform may cause the synthesized data to be displayed via the virtual space.

20 Claims, 13 Drawing Sheets

(51) Int. Cl.
    *G06F 40/40*     (2020.01)
    *G06N 20/00*     (2019.01)
    *G06T 19/00*     (2011.01)
    *H04L 51/02*     (2022.01)
    *H04L 51/48*     (2022.01)
    *H04L 51/52*     (2022.01)
    *H04L 67/306*     (2022.01)

(52) U.S. Cl.
    CPC ............. *G06N 20/00* (2019.01); *G06T 19/00* (2013.01); *H04L 51/02* (2013.01); *H04L 51/48* (2022.05); *H04L 51/52* (2022.05); *H04L 67/306* (2013.01)

(58) Field of Classification Search
    CPC ......... H04L 51/02; H04L 51/48; H04L 51/52; H04L 67/306
    See application file for complete search history.

(56) References Cited

U.S. PATENT DOCUMENTS

| | | | |
|---|---|---|---|
| 11,665,284 | B2 | 5/2023 | Jorasch et al. |
| 11,977,854 | B2 | 5/2024 | Tunstall-Pedoe et al. |
| 11,995,803 | B1 | 5/2024 | Karpman et al. |
| 2014/0080428 | A1 | 3/2014 | Rhoads et al. |
| 2018/0287982 | A1 | 10/2018 | Draeger et al. |
| 2019/0138904 | A1 | 5/2019 | Millius et al. |
| 2019/0272325 | A1 | 9/2019 | Korn |
| 2020/0089812 | A1 | 3/2020 | Kline et al. |
| 2021/0192134 | A1 | 6/2021 | Yue et al. |
| 2021/0255744 | A1 | 8/2021 | Sullivan et al. |
| 2022/0093088 | A1 | 3/2022 | Rangarajan Sridhar et al. |
| 2022/0122587 | A1 | 4/2022 | Thomson et al. |
| 2022/0167108 | A1 | 5/2022 | Laaksonen et al. |
| 2022/0180060 | A1 | 6/2022 | Jain et al. |
| 2022/0368660 | A1 | 11/2022 | Niess et al. |
| 2023/0020886 | A1 | 1/2023 | Mahapatra et al. |
| 2023/0176829 | A1 | 6/2023 | Rahmani et al. |
| 2023/0185957 | A1* | 6/2023 | Brown ................... G06Q 50/01 726/26 |
| 2023/0259705 | A1 | 8/2023 | Tunstall-Pedoe et al. |
| 2023/0274086 | A1 | 8/2023 | Tunstall-Pedoe et al. |
| 2023/0274094 | A1 | 8/2023 | Tunstall-Pedoe et al. |
| 2024/0037583 | A1* | 2/2024 | Wilson ..................... G06N 7/01 |
| 2024/0039905 | A1 | 2/2024 | Talavera |
| 2024/0079102 | A1 | 3/2024 | Goravar et al. |
| 2024/0104467 | A1 | 3/2024 | Guha et al. |
| 2024/0220717 | A1 | 7/2024 | Nagargoje |
| 2024/0273286 | A1 | 8/2024 | Iu et al. |
| 2024/0412003 | A1 | 12/2024 | Heller et al. |
| 2024/0420453 | A1* | 12/2024 | Gupta ..................... G06F 40/30 |
| 2025/0007870 | A1 | 1/2025 | Kim et al. |
| 2025/0045516 | A1 | 2/2025 | Reyna Fernandez et al. |
| 2025/0061290 | A1 | 2/2025 | Gardner et al. |
| 2025/0077844 | A1 | 3/2025 | Lin et al. |
| 2025/0086404 | A1 | 3/2025 | Fong |
| 2025/0086546 | A1 | 3/2025 | Chan |
| 2025/0086895 | A1 | 3/2025 | Chan |
| 2025/0088479 | A1 | 3/2025 | Chan |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 5 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

Chiang CH, Lee HY. Can large language models be an alternative to human evaluations?. arXiv preprint arXiv:2305.01937, May 3, 2023.

Lee, M., Liang, P., & Yang, Q., Coauthor: Designing a human-ai collaborative writing dataset for exploring language model capabilities. In Proceedings of the 2022 CHI conference on human factors in computing systems, pp. 1-19.

Office Action for U.S. Appl. No. 18/429,289, Dated Aug. 12, 2025, 18 pages.

* cited by examiner

User A
- Threads
- All DMs
- Mentions & reactions
- Saved items
- Connect
- More
- ▲ Connections
- ▲ Channels
  - # general
  - # feedback
  - # Analyze-fe...
  - # Help-Onboarding
- ▲ Documents
- ▼ Direct messages
  - J. Smith
  - C. Simon
  - J. Smith, B. Good...
- ▲ Apps Help-Tech Search Help-Tech Sentiment Analysis for #feedback
★ 1 Pinned  + Add a bookmark

Sentiment Analysis for #feedback

Sentiment Analysis:
Here is a summary of the sentiment analysis from the provided CSV data:

Sentiment Count:
Positive: 10
Negative: 8

Overall Sentiment:
The sentiment leans slightly positive, with 10 positive responses and 8 negative responses.

Key Areas per Top Issue Category:

Loyalty Program:
- Mixed sentiment on loyalty program rewards. Some found them appealing and motivating, while others saw room for improvement and more personalization.
- Clearer instructions needed on how to redeem loyalty rewards.

FIG. 8

SYNTHESIZING VIRTUAL SPACE DATA

RELATED APPLICATIONS

This application claims the benefit of priority to U.S. Patent Application 63/537,758, filed Sep. 11, 2023, which is incorporated herein by reference in its entirety.

TECHNICAL FIELD

Communication platforms are becoming increasingly more popular for organizations to facilitate work related communications. Users of such communication platforms can communicate with other users via channels, direct messages, and/or other virtual spaces. In some examples, channels (or any other virtual space) may include a canvas that provides a means for curating, organizing, and sharing collections of information between users. In such instances, various members of the channel may be tasked with manually inputting and/or maintaining the content found on the canvas. Accordingly, such manual tasks may result in inaccurate data, delays in updating such data, and inefficient use of user time.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 2B illustrates a user interface for multimedia collaboration sessions within the group-based communication system for certain examples.

FIG. 7 illustrates an example user interface associated with a communication platform for enabling a user to engage a machine-learning model to synthesize feedback provided by a plurality of users of a virtual space.

FIG. 8 illustrates an example user interface associated with a communication platform displaying a document containing synthesized data and generated by a machine-learning model.

DETAILED DESCRIPTION

Figure 1:
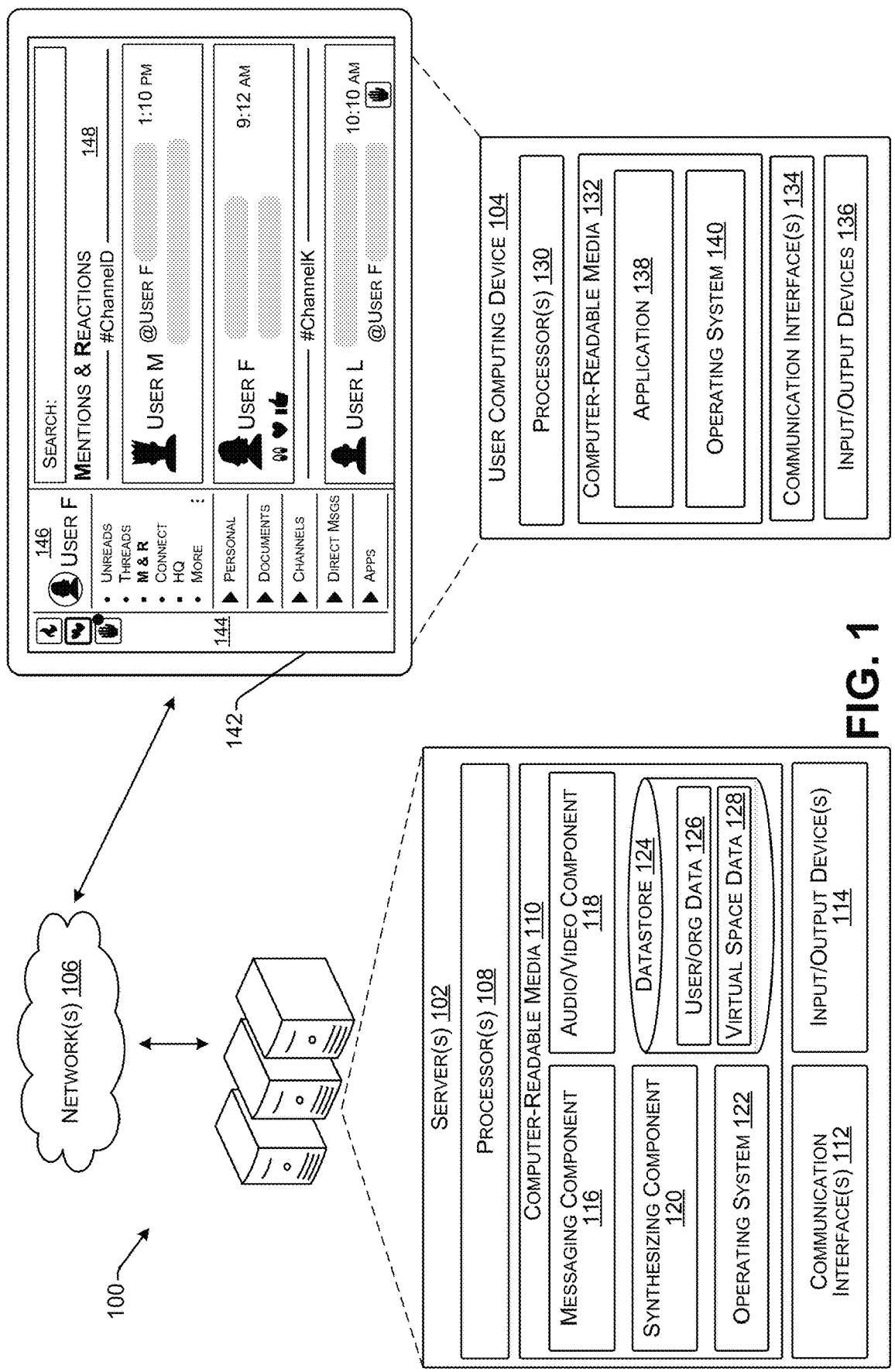
FIG. 1 illustrates an example system for performing techniques described herein.

Techniques for generating synthesized data within a virtual space are discussed herein. That is, machine-learning model(s) may be used to determine, update, modify, and/or synthesize various types of data within a virtual space. In some examples, a communication platform may receive a request from a user profile (e.g., member, administrator, etc.) of a communication platform. The request may include one or more instructions for the communication platform to send a request to one or more user profiles (e.g., members of a virtual space, administrative user profiles, etc.) to provide data (e.g., feedback) to the virtual space. That is, the user profile may request that user profiles provide feedback concerning a topic, feature, product, and/or concept of the communication platform. Based on sending the request for feedback to the user profiles, the communication platform may receive feedback from such user profiles. Upon receiving the feedback, the communication platform may receive a request from a user profile (e.g., member of the virtual space, administrative user or profile, etc.) to analyze, synthesize, or otherwise evaluate such data. Upon receiving the request to synthesize the data (e.g., feedback), the communication platform may input the user feedback into a machine-learning model trained to output third party data, first party data, and/or a document including an evaluation (or summary) of the feedback. In response to receiving the output from the machine-learning model, the communication platform may cause the output data (e.g., document, file, and/or any other type of data) to be displayed via the virtual space. In such instances, the user profile (or any other user profile possessing sufficient permissions) may interact with the document and/or third party data via the virtual space. As discussed throughout this disclosure, the techniques may improve the user experience by displaying data synthesized by one or more machine-learning models, in addition to limiting work required for user profiles to manually synthesize vast numbers of user profile feedback.

When evaluating feedback from various user profiles, conventional techniques for generating synthesized data may be ineffective, inefficient, disruptive to the user experience, and/or lead to suboptimal results. For example, a user profile may be a member of many virtual spaces (e.g., channel(s), thread(s), board(s), direct messaging instance(s), multiparty instance(s), etc.). Such virtual spaces may include large quantities of user profiles that are also members of the virtual space. In some cases, a member of a virtual space may send a request to the large numbers of user profiles associated with the virtual space to seek feedback regarding a new feature, a product, a service, etc. However, to make use of the feedback, a user profile may be required to manually analyze and/or synthesize all the feedback data. That is, to create synthesized representations of the feedback data, one or more user profiles may be required to analyze vast amounts of data. Overall, the inefficiencies described above creates wasted time as users are required to manually analyze the feedback to identify trends and/or accurate representations of the feedback. Consequently, the vast amount of manual review of the feedback may cause increased use of computing resources, processing power, etc., which may increase latency associated with the communication platform.

To address these and other technical problems and inefficiencies, the systems and/or techniques described herein may include a synthesizing component configured to generate synthesized representations of feedback using one or more machine-learning models. The technical solutions discussed herein solve one or more technical problems associated with conventional data synthesizing techniques resulting in a suboptimal and/or inadequate user experience. The techniques described herein can reduce the use of computing resources by reducing the time and steps spent by users to manually create synthesized data.

Initially, the communication platform may receive a request from a user profile. In some examples, the communication platform can be a group-based communication platform, a channel-based messaging platform, a sales-based platform, and/or any other platform for facilitating communication between and among users. Users can use a variety of devices (or "user devices") to access the communication platform. Such devices may include any suitable type of computing device, e.g., portable, semi-portable, semi-stationary, or stationary. Some examples of a user device can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein.

In some examples, the communication platform may receive, from a user profile, a request that includes instructions to send a survey to one or more user profiles (e.g., members of a virtual space, administrative user profiles, etc.) and/or entities (e.g., companies, organizations, departments, etc.). That is, a user profile may request that various user profiles and/or entities (e.g., external to the communication platform or internal to the communication platform) provide feedback concerning one or more topics, features, products, services, and/or concepts. A survey may be a questionnaire, a question, a form to fill out, a virtual space containing one or more questions, etc. As an example, a user profile may have launched a new product and wants to receive feedback about how various aspects of the product function. Alternatively, an entity may want to receive feedback from customers regarding the quality of its services. In such cases, the user profile or entity may send one or more surveys (e.g., questionnaire, forms, etc.) that includes options for the recipient to provide the desired feedback. That is, the request received by the communication platform may include the type of survey to send and/or the one or more user profiles and/or entities (e.g., recipient user profiles and/or recipient entities) to which the survey is to be sent.

Based on receiving the request, the communication platform may send a survey to the intended recipients. Depending on the type of survey, the communication platform may send various types of data. For example, if the survey is a virtual space that includes one or more questions to answer, the communication platform may send an invitation to join the virtual space. If the survey is a document, form, or link, the communication platform may send the document, form, or link via a messaging system (e.g., email, direct messaging instance, etc.). As such, the recipient(s) may receive access to the survey.

In some examples, the communication platform may receive feedback from the intended recipients. Based on receiving the survey from the communication platform, the intended recipient(s) of the survey may provide one or more responses to the one or more prompts within the survey. In such instances, the one or more responses may be feedback. The communication platform may store the feedback in a virtual space (e.g., a channel, a direct messaging instance, a multiparty direct messaging instance, a board, etc.), a document, a file, etc. In such instances, one or more user profiles of the communication platform may access the feedback and determine a manner in which to process such data.

In some examples, based on receiving the feedback, the communication platform may receive a request from a user profile to analyze and/or synthesize the feedback. That is, a user profile of the communication platform may send a request to the communication platform to synthesize the feedback. The user profile may send the request by selecting an actionable user interface element configured to execute a workflow designed to synthesize feedback. That is, a user profile may generate a workflow configured to synthesize data. A workflow can include an automation of a task that, in some examples, was previously performed manually by a user profile of the communication platform. In such examples, the user profile may use one or more modular functions to build the workflow. A modular function may be a no-code building block used in a workflow to automate an operation within the workflow. In this case, the user profile may use various modular functions configured to perform one or more different functionalities. For example, the workflow may include a first modular function configured to retrieve the feedback or content (e.g., text, emoji, etc.) from the file, document, virtual space, etc. The workflow may also include a second modular function configured to input the content into a machine-learning model trained to synthesize data. Further, the workflow may include a third modular function configured to display an output of the machine-learning model to a user interface. However, this is not intended to be limiting; in other examples, the workflow may include more or fewer modular functions configured perform similar or different operations.

When the workflow has been created, the communication platform may cause the workflow to be displayed within a virtual space. The workflow may be displayed via an overlay or pop-up notification. In such examples, the displayed workflow may be an actionable user interface element enabling a user profile to, upon selection, send a request to the communication platform to execute the workflow. That is, the communication platform may receive user input data indicative of a request to perform the workflow and synthesize the feedback provided by the intended recipients.

Based on receiving the request to analyze the feedback, the communication platform may retrieve the feedback from the location at which it is being stored. As noted above, the feedback may be stored within a document, a file, a virtual space, and/or any other location. In such examples, the communication platform may retrieve the data (e.g., text, images, GIFs, videos, etc.) associated with the feedback. Upon receiving the feedback, the communication platform may perform a synthesizing operation.

In some examples, based on receiving the feedback, the communication platform may input the feedback into a machine-learning model trained to generate synthesized data. The communication platform may include one or more machine-learning models trained to perform a synthesizing operation. In some instances, the machine-learning models may be large language models (or LLMs). Upon identifying the data to synthesize, the communication platform may provide the data as input into the machine-learning model(s)

trained to output content consistent with a synthesized representation of the data (or feedback) input to the machine-learning model(s). In some examples, the output content may be a file that contains the synthesized data, a document that includes the synthesized data, a link to a virtual space that includes the synthesized data, the virtual space that includes the synthesized data, etc.

In some cases, the communication platform may cause the synthesized data to be displayed via a user interface associated with the user profile. The communication platform may cause the synthesized data to be displayed at one or more locations within the communication platform. In some examples, the communication platform may display the synthesized data via a separate interface such as an overlay interface (or overlay user interface), a popup box, and/or any other type of interface. For example, the synthesized feedback may be stored within a document. In such instances, the communication platform may render the document as an overlay notification. The overlay notification may display a portion of the synthesized data (e.g., a preview of the synthesized data). However, a user profile may request to view the entirety of the synthesized data by interacting with the overlay notification. That is, the overlay notification may be an actionable user interface element that, upon being selected, may cause the entirety of the data stored therein to be accessed, viewed, etc. Accordingly, the communication platform may receive user input data (e.g., selection of the overlay notification) indicative of an intent to view the entirety of the synthesized data. In such instances, the communication platform may cause the document to open and/or cause the synthesized data stored therein to be displayed via the user interface of the communication platform.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and/or input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a synthesizing component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the synthesizing component 120 can generate synthesized data within a virtual space. That is, machine-learning model(s) may be used to determine, update, modify, and/or synthesize various types of data within a virtual space. In other examples, a synthesizing component 120 may receive a request from a user profile (e.g., member, administrator, etc.) of a communication platform. The request may include one or more instructions for the synthesizing component 120 to send a request to one or more user profiles (e.g., members of a virtual space, administrative user profiles, etc.) to provide data (e.g., feedback) to the virtual space. That is, the user profile may request that user profiles of a virtual space provide feedback concerning a topic, feature, product, and/or concept of the communication platform. Based on sending the request for feedback to the user profiles, the synthesizing component 120 may receive feedback from the user profiles. Upon receiving such feedback, the synthesizing component 120 may receive a request from a user profile (e.g., member of the virtual space, administrative user or profile, etc.) to analyze, synthesize, or otherwise evaluate such data. Upon receiving the request to analyze the data (e.g., feedback), the synthesizing component 120 may input the user feedback into a machine-learning model trained to output third party data, first party data, and/or a document including an evaluation (or summary) of the feedback. In response to receiving the output from the machine-learning model, the synthesizing component 120 may cause the output data (e.g., document, file, and/or any other type of data) to be displayed via the virtual space. In such instances, the user profile (or any other user profile possessing sufficient permissions) may interact with the document and/or third party data via the virtual space.

In some examples, the communication platform can manage communication channels. In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In some examples, a channel can be a virtual space where people can post messages, documents, and/or files. In some examples, access to channels can be controlled by permissions. In some examples, channels can be limited to a single organization, shared between different organizations, public, private, or special channels (e.g., hosted channels with guest accounts where guests can make posts but are prevented from performing certain actions, such as inviting other users to the channel). In some examples, some users can be invited to channels via email, channel invites, direct messages, text messages, and the like. Examples of channels and associated functionality are discussed throughout this disclosure.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

In some examples, such as when a channel is shared between two organizations, each organization can be associated with its own encryption key. When a user associated with one organization posts a message or file to the shared channel it can be encrypted in the datastore 124 with the encryption key specific to the organization and the other organization can decrypt the message or file prior to accessing the message or file. Further, in examples where organizations are in different geographical areas, data associated with a particular organization can be stored in a location corresponding to the organization and temporarily cached at a location closer to a client (e.g., associated with the other organization) when such messages or files are to be accessed. Data can be maintained, stored, and/or deleted in the datastore 124 in accordance with a data governance policy associated with each specific organization.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via WebSockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. In some examples, the third region 148 may be resized or popped out as a standalone window.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via WebSockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the synthesizing component 120, and the application 138, techniques described herein can be performed by any other component, or combination of components, which can be associated with the server(s) 102, the user computing device 104, or a combination thereof.

User Interface for a Group-Based Communication System

Figure 2A:
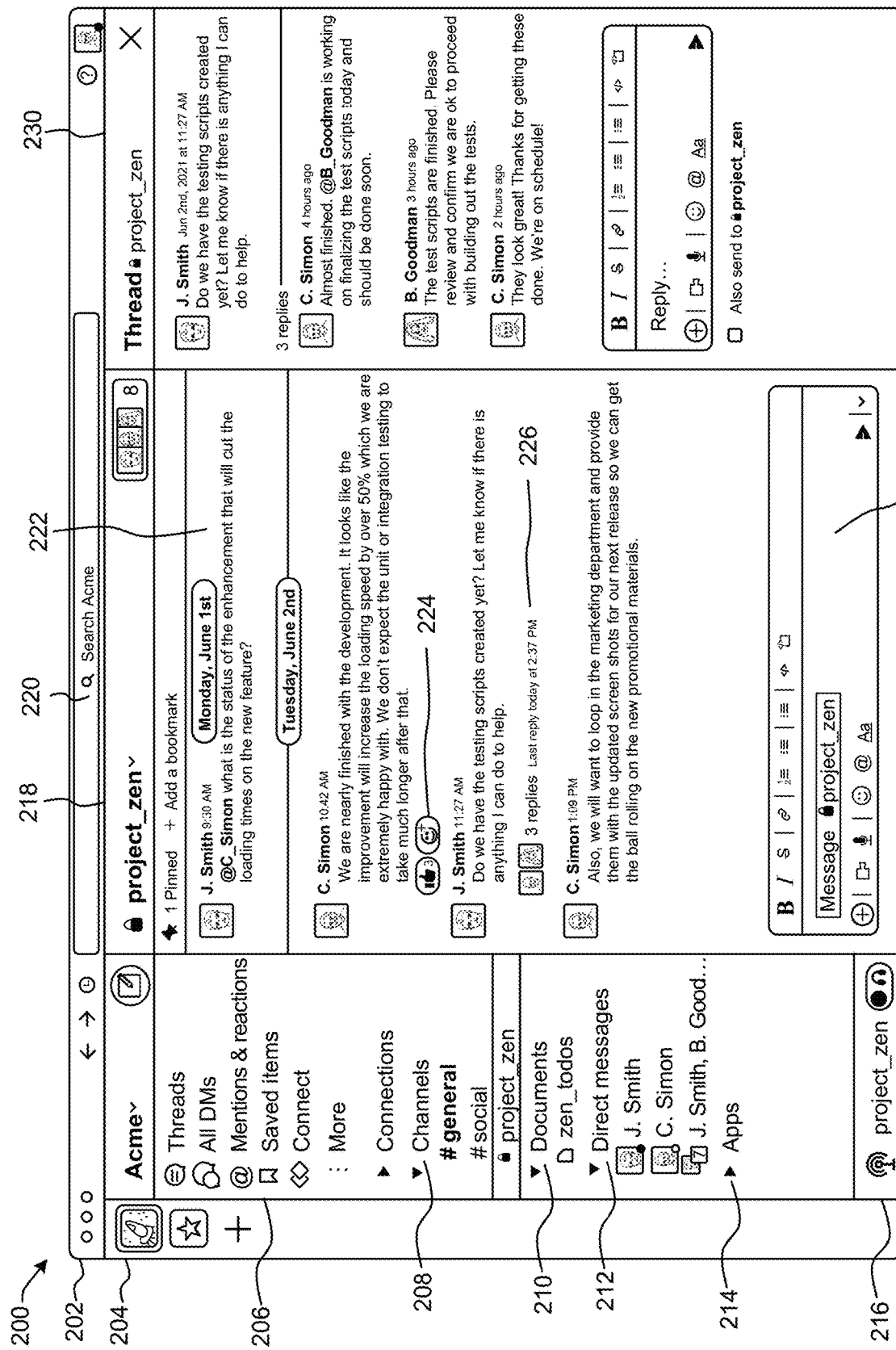
FIG. 2A illustrates a user interface for a group-based communication system for certain examples.

FIG. 2A illustrates a user interface 200 of a group-based communication system, which will be useful in illustrating the operation of various examples discussed herein. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

The user interface 200 comprises a plurality of objects such as panes, text entry fields, buttons, messages, or other user interface components that are viewable by a user of the group-based communication system. As depicted, the user interface 200 comprises a title bar 202, a workspace pane 204, a navigation pane 206, channels 208, documents 210 (e.g., collaborative documents), direct messages 212, applications 214, a synchronous multimedia collaboration session pane 216, and channel pane 218.

By way of example and without limitation, when a user opens the user interface 200 they can select a workspace via the workspace pane 204. A particular workspace may be associated with data specific to the workspace and accessible via permissions associated with the workspace. Different sections of the navigation pane 206 can present different data and/or options to a user. Different graphical indicators may be associated with virtual spaces (e.g., channels) to summarize an attribute of the channel (e.g., whether the channel is public, private, shared between organizations, locked, etc.). When a user selects a channel, a channel pane 218 may be presented. In some examples, the channel pane 218 can include a header, pinned items (e.g., documents or other virtual spaces), an "about" document providing an overview of the channel, and the like. In some cases, members of a channel can search within the channel, access content associated with the channel, add other members, post content, and the like. In some examples, depending on the permissions associated with a channel, users who are not members of the channel may have limited ability to interact with (or even view or otherwise access) a channel. As users navigate within a channel they can view messages 222 and may react to messages (e.g., a reaction 224), reply in a thread, start threads, and the like. Further, a channel pane 218 can include a compose pane 228 to compose message(s) and/or other data to associate with a channel. In some examples, the user interface 200 can include a threads pane 230 that provides additional levels of detail of the messages 222. In some examples, different panes can be resized, panes can be popped out to independent windows, and/or independent windows can be merged to multiple panes of the user interface 200. In some examples, users may communicate with other users via a collaboration pane 216, which may provide synchronous or asynchronous voice and/or video capabilities for communication. Of course, these are illustrative examples and additional examples of the aforementioned features are provided throughout this disclosure.

In some examples, title bar 202 comprises search bar 220. The search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some examples, the title bar 202 comprises navigation commands allowing a user to move backwards and forwards between different panes, as well as to view a history of accessed content. In some examples, the title bar 202 may comprise additional resources such as links to help documents and user configuration settings.

In some examples, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some examples, the user interface 200 comprises the workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use the workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some examples, an organization, such as a particular company, may have a plurality of workspaces, and the user may be associated with one or more workspaces belonging to the organization. In yet other examples, a particular workspace can be associated with one or more organizations or other entities associated with the group-based communication system.

In some examples, the navigation pane 206 permits users to navigate between virtual spaces such as pages, channels 208, collaborative documents 210 (such as those discussed at FIG. 2D), applications 214, and direct messages 212 within the group-based communication system. For example, the navigation pane 206 can include indicators representing virtual spaces that can aggregate data associated with a plurality of virtual spaces of which the user is a member. In at least one example, each virtual space can be associated with an indicator in the navigation pane 206. In some examples, an indicator can be associated with an actuation mechanism (e.g., an affordance, also referred to as a graphical element) such that when actuated, can cause the user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally or in the alternative, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

The navigation pane 206 may further comprise indicators representing communication channels (e.g., the channels 208). In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the navigation pane 206 may depict some or all of the communication channels that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the navigation pane 206 can depict some or all of the communication channels that the user is a member of, and the user can interact with the user interface 200 to browse or view other communication channels that the user is not a member of but are not currently displayed in the navigation pane 206. In some examples, different types of communication channels (e.g., public, private, shared, cross-workspace, etc.) can be in different sections of the navigation pane 206, or can have their own sub-regions or sub-panes in the user interface 200. In some examples, communication channels associated with different workspaces can be in different sections of the navigation pane 206, or can have their own regions or panes in the user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the navigation pane 206 can include indicators representative of communications with individual users or multiple specified users (e.g., instead of all, or a subset of, members of an organization). Such communications can be referred to as "direct messages." The navigation pane 206 can include indicators representative of virtual spaces that are associated with private messages between one or more users.

The direct messages 212 may be communications between a first user and a second user, or they may be multi-person direct messages between a first user and two or more second users. The navigation pane 206 may be sorted and organized into hierarchies or sections depending on the user's preferences. In some examples, all of the channels to which a user has been granted access may appear in the navigation pane 206. In other examples, the user may choose to hide certain channels or collapse sections containing certain channels. Items in the navigation pane 206 may indicate when a new message or update has been received or is currently unread, such as by bolding the text associated with a channel in which an unread message is located or adding an icon or badge (for example, with a count of unread messages) to the channel name. In some examples, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally or in the alternative, the navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels within the Group-Based Communication System

In some examples, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some examples, the channel pane 218 may display information related to a channel that a user has selected in the navigation pane 206. For example, a user may select the project_zen channel to discuss the ongoing software development efforts for Project Zen. In some examples, the channel pane 218 may include a header comprising information about the channel, such as the channel name, the list of users in the channel, and other channel controls. Users may be able to pin items to the header for later access and add bookmarks to the header. In some examples, links to collaborative documents may be included in the header. In further examples, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via the channel pane 218 of the user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

The channel pane 218 may include messages such as message 222, which is content posted by a user into the channel. Users may post text, images, videos, audio, or any other file as the message 222. In some examples, particular identifiers (in messages or otherwise) may be denoted by prefixing them with predetermined characters. For example, channels may be prefixed by the "#" character (as in #project_zen) and username may be prefixed by the "@" character (as in @J_Smith or @User_A). Messages such as the message 222 may include an indication of which user posted the message and the time at which the message was posted. In some examples, users may react to messages by selecting a reaction button 224. The reaction button 224 allows users to select an icon (sometimes called a reacji in this context), such as a thumbs up, to be associated with the message. Users may respond to messages, such as the message 222, of another user with a new message. In some examples, such conversations in channels may further be broken out into threads. Threads may be used to aggregate messages related to a particular conversation together to make the conversation easier to follow and reply to, without cluttering the main channel with the discussion. Under the message beginning the thread appears a thread reply preview 226. The thread reply preview 226 may show information related to the thread, such as, for example, the number of replies and the members who have replied. Thread replies may appear in a thread pane 230 that may be separate from the channel pane 218 and may be viewed by other members of the channel by selecting the thread reply preview 226 in the channel pane 218.

In some examples, one or both of the channel pane 218 and the thread pane 230 may include a compose pane 228. In some examples, the compose pane 228 allows users to compose and transmit messages 222 to the members of the channel or to those members of the channel who are following the thread (when the message is sent in a thread). The compose pane 228 may have text editing functions such as bold, strikethrough, and italicize, and/or may allow users to format their messages or attach files such as collaborative documents, images, videos, or any other files to share with other members of the channel. In some examples, the compose pane 228 may enable additional formatting options such as numbered or bulleted lists via either the user interface or an API. The compose pane 228 may also function as a workflow trigger to initiate workflows related to a channel or message. In further examples, links or documents sent via the compose pane 228 may include unfurl instructions related to how the content should be displayed.

Synchronous Multimedia Collaboration Sessions

Figure 2B:
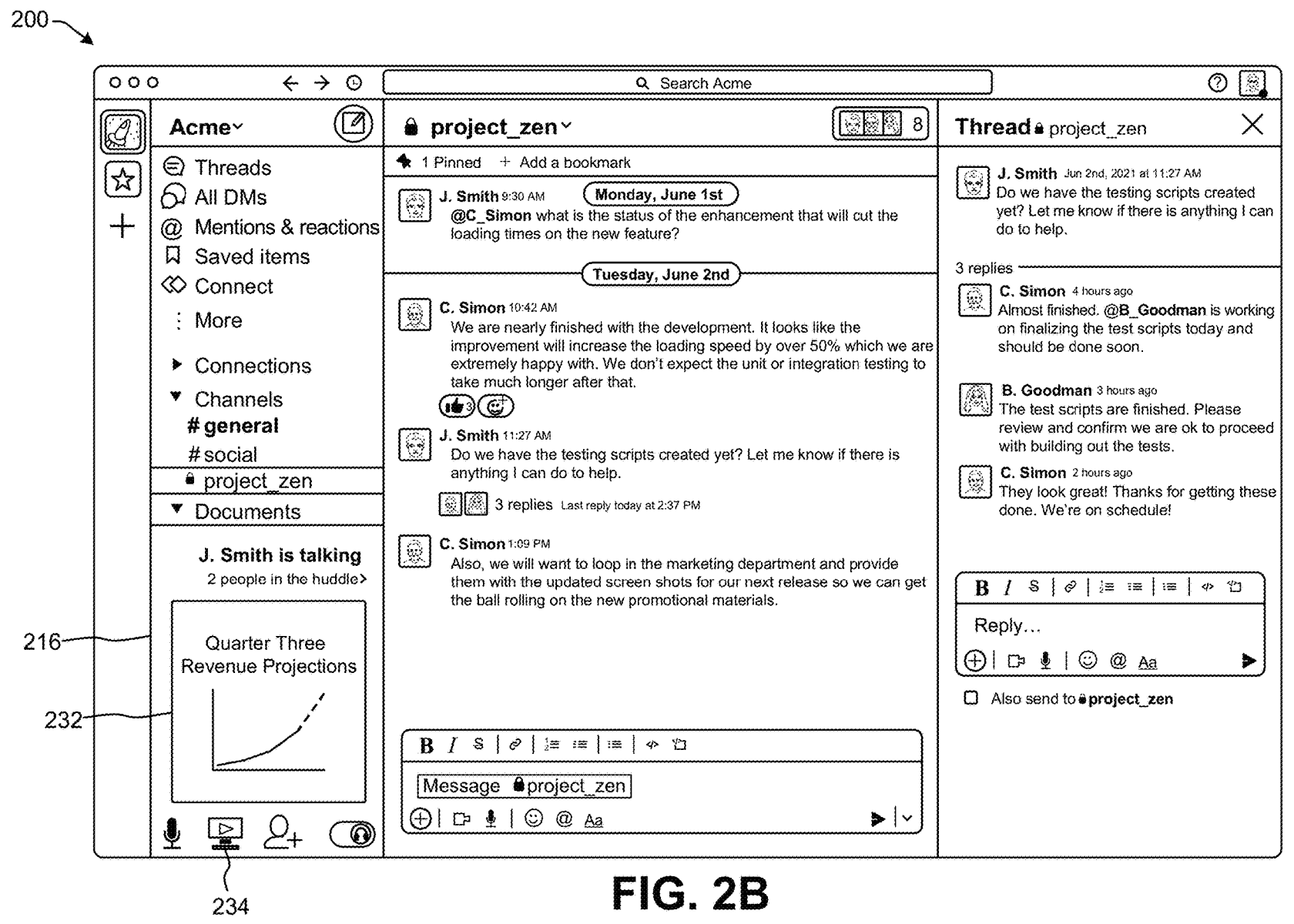

FIG. 2B illustrates a multimedia collaboration session (e.g., a synchronous multimedia collaboration session) that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some examples, synchronous multimedia collaboration sessions may be based around a particular topic, a particular channel, a particular direct message or multi-person direct message, or a set of users, while in other examples, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some examples, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without requiring scheduling or initiating a communication session through a third-party interface. In some examples, users may be directly invited to attend a synchronous multimedia collaboration session via a message or notification.

Synchronous multimedia collaboration sessions may be short, ephemeral sessions from which no data is persisted. Alternatively, in some examples, synchronous multimedia collaboration sessions may be recorded, transcribed, and/or summarized for later review. In other examples, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some examples, members of the synchronous multimedia collaboration session may mark-up, comment on, draw on, or otherwise annotate a shared screen. In further examples, such annotations may be saved and persisted after the synchronous multimedia collaboration session has ended. A canvas may be created directly from a synchronous multimedia collaboration session to further enhance the collaboration between users.

In some examples, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 232. In some examples, users in the synchronous multimedia collaboration session may be displayed with an icon indicating that they are participating in the synchronous multimedia collaboration session. In further examples, an expanded view of the participants may show which users are active in the synchronous multimedia collaboration session and which are not. Screen share preview 232 may depict the desktop view of a user sharing the user's screen, or a particular application or presentation. Changes to the user's screen, such as the user advancing to the next slide in a presentation, will automatically be depicted in screen share preview 232. In some examples, the screen share preview 232 may be actuated to cause the screen share preview 232 to be enlarged such that it is displayed as its own pane within the group-based communication system. In some examples, the screen share preview 232 can be actuated to cause the screen share preview 232 to pop out into a new window or application separate and distinct from the group-based communication system. In some examples, the synchronous multimedia collaboration session pane 216 may comprise tools for the synchronous multimedia collaboration session allowing a user to mute the user's microphone or invite other users. In some examples, the synchronous multimedia collaboration session pane 216 may comprise a screen share button 234 that may permit a user to share the user's screen with other members of the synchronous multimedia collaboration session pane 216. In some examples, the screen share button 234 may provide a user with additional controls during a screen share. For example, a user sharing the user's screen may be provided with additional screen share controls to specify which screen to share, to annotate the shared screen, or to save the shared screen.

In some cases, the synchronous multimedia collaboration session pane 216 may persist in the navigation pane 206 regardless of the state of the group-based communication system. In some examples, when no synchronous multimedia collaboration session is active and/or depending on which item is selected from the navigation pane 206, the synchronous multimedia collaboration session pane 216 may be hidden or removed from being presented via the user interface 200. In some instances, when the pane 216 is active, the pane 216 can be associated with a currently selected channel, direct message, or multi-person direct message such that a synchronous multimedia collaboration session may be initiated and associated with the currently selected channel, direct message, or multi-person direct message.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some examples, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some examples, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some examples, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some examples, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some examples, one or more recommended asynchronous multimedia collaboration sessions or meetings can be displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some examples, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some examples, a preview of a subset of video replies may be shown in the asynchronous collaboration session or thread. This can allow, for example, a user to jump to a relevant segment of the asynchronous multimedia collaboration session or to pick up where they left off previously.

Connecting within the Group-Based Communication System

Figure 2C:
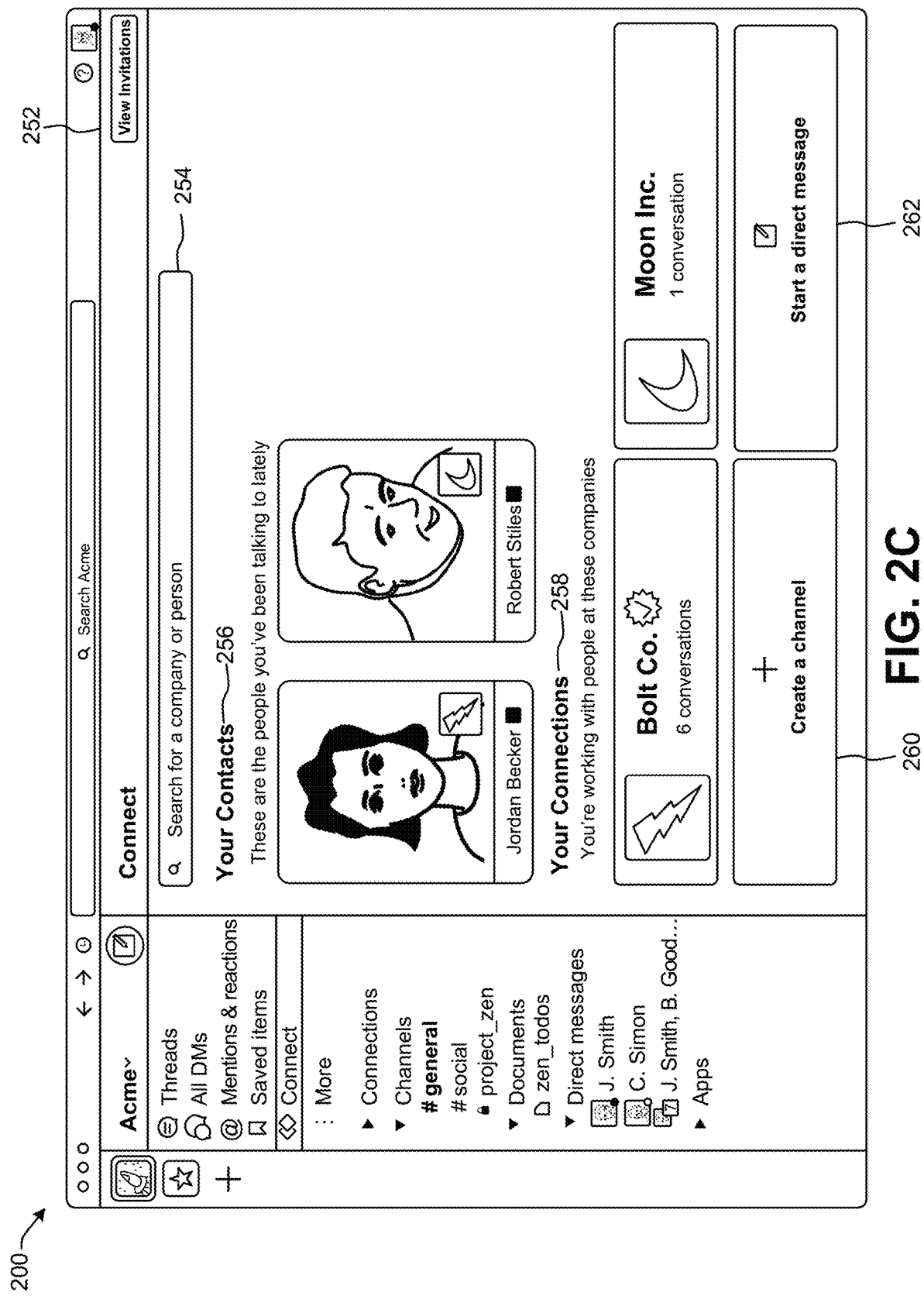
FIG. 2C illustrates a user interface for inter-organization collaboration within the group-based communication system for certain examples.

FIG. 2C illustrates user interface 200 displaying a connect pane 252. The connect pane 252 may provide tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. The connect pane 252 may enable users to determine which other users and organizations are already within the group-based communication system, and to invite those users and organizations currently outside of the group-based communication system to join.

The connect pane 252 may comprise a connect search bar 254, recent contacts 256, connections 258, a create channel button 260, and/or a start direct message button 262. In some examples, the connect search bar 254 may permit a user to search for users within the group-based communication system. In some examples, only users from organizations that have connected with the user's organization will be shown in the search results. In other examples, users from any organization that uses the group-based communication system can be displayed. In still other examples, users from organizations that do not yet use the group-based communication can also be displayed, allowing the searching user to invite them to join the group-based communication system. In some examples, users can be searched for via their group-based communication system username or their email address. In some examples, email addresses may be suggested or autocompleted based on external sources of data such as email directories or the searching user's contact list.

In some examples, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some examples, the recent contacts 256 may display users with whom the instant user has recently interacted. The recent contacts 256 may display the user's name, company, and/or a status indication. The recent contacts 256 may be ordered based on which contacts the instant user most frequently interacts with or based on the contacts with whom the instant user most recently interacted. In some examples each recent contact of the recent contacts 256 may be an actuatable control allowing the instant user to quickly start a direct message conversation with the recent contact, invite them to a channel, or take any other appropriate user action for that recent contact.

In some examples, the connections 258 may display a list of companies (e.g., organizations) with which the user has interacted. For each company, the name of the company may be displayed along with the company's logo and an indication of how many interactions the user has had with the company, for example the number of conversations. In some examples, each connection of the connections 258 may be an actuatable control allowing the instant user to quickly invite the external organization to a shared channel, display recent connections with that external organization, or take any other appropriate organization action for that connection.

In some examples, the create channel button 260 allows a user to create a new shared channel between two different organizations. Selecting the create channel button 260 may further allow a user to name the new connect channel and enter a description for the connect channel. In some examples, the user may select one or more external organizations or one or more external users to add to the shared channel. In other examples, the user may add external organizations or external users to the shared channel after the shared channel is created. In some examples, the user may elect whether to make the connect channel private (e.g., accessible only by invitation from a current member of the private channel).

In some examples, the start direct message button 262 allows a user to quickly start a direct message (or multi-person direct message) with external users at an external organization. In some examples, the external user identifier at an external organization may be supplied by the instant user as the external user's group-based communication system username or as the external user's email address. In some examples, an analysis of the email domain of the external user's email address may affect the message between the user and the external user. For example, the external user's identifier may indicate (for example, based on an email address domain) that the user's organization and the external user's organization are already connected. In some such examples, the email address may be converted to a group-based communication system username. Alternatively, the external user's identifier may indicate that the external user's organization belongs to the group-based communication system but is not connected to the instant user's organization. In some such examples, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
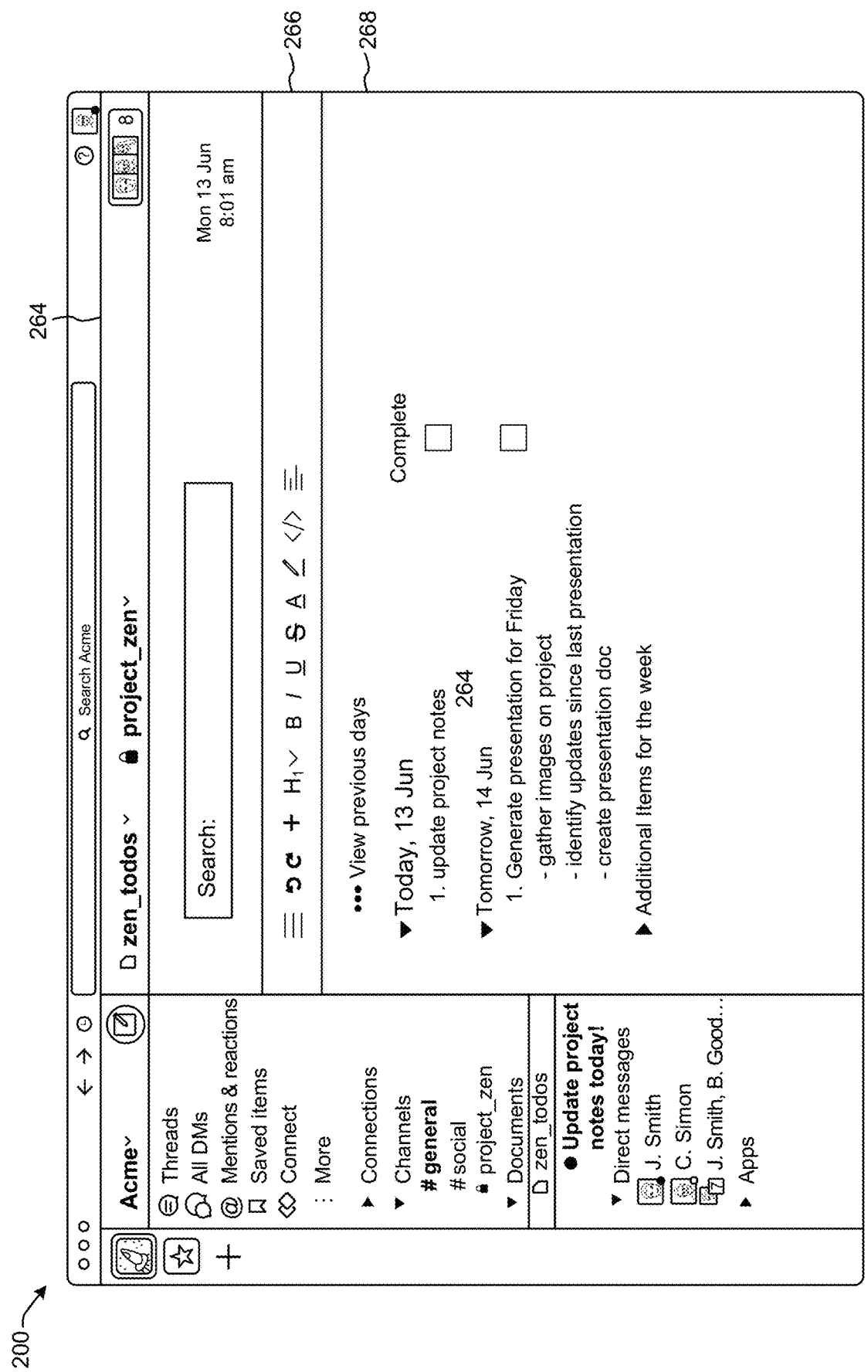
FIG. 2D illustrates a user interface for collaborative documents within the group-based communication system for certain examples.

FIG. 2D illustrates user interface 200 displaying a collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. In some examples, permissions can be determined and/or assigned automatically based on how document(s) are created and/or shared. In some examples, permission can be determined manually. Collaborative documents may allow users to simultaneously or asynchronously create and modify documents. Collaborative documents may integrate with the group-based communication system and can both initiate workflows and be used to store the results of workflows, which are discussed further below with respect to FIGS. 3A and 3B.

In some examples, the user interface 200 can comprise one or more collaborative documents (or one or more links to such collaborative documents). A collaborative document (also referred to as a document or canvas) can include a flexible workspace for curating, organizing, and sharing collections of information between users. Such documents may be associated with a synchronous multimedia collaboration session, an asynchronous multimedia collaboration session, a channel, a multi-person direct message conversation, and/or a direct message conversation. Shared canvases can be configured to be accessed and/or modified by two or more users with appropriate permissions. Alternatively or in addition, a user might have one or more private documents that are not associated with any other users.

Further, such documents can be @mentioned, such that particular documents can be referred to within channels (or other virtual spaces or documents) and/or other users can be @mentioned within such a document. For example, @mentioning a user within a document can provide an indication to that user and/or can provide access to the document to the user. In some examples, tasks can be assigned to a user via an @mention and such task(s) can be populated in the pane or sidebar associated with that user.

In some examples, a channel and a collaborative document 268 can be associated such that when a comment is posted in a channel it can be populated to a document 268, and vice versa.

In some examples, when a first user interacts with a collaborative document, the communication platform can identify a second user account associated with the collaborative document and present an affordance (e.g., a graphical element) in a sidebar (e.g., the navigation pane 206) indicative of the interaction. Further, the second user can select the affordance and/or a notification associated with or representing the interaction to access the collaborative document, to efficiently access the document and view the update thereto.

In some examples, as one or more users interact with a collaborative document, an indication (e.g., an icon or other user interface element) can be presented via user interfaces with the collaborative document to represent such interactions. For examples, if a first instance of the document is presently open on a first user computing device of a first user, and a second instance of the document is presently open on a second user computing device of a second user, one or more presence indicators can be presented on the respective user interfaces to illustrate various interactions with the document and by which user. In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document), and the manner in which the user is interacting with the document (e.g., currently editing, viewing, open but not active, etc.).

In some examples, a preview of a collaborative document can be provided. In some examples, a preview can comprise a summary of the collaborative document and/or a dynamic preview that displays a variety of content (e.g., as changing text, images, etc.) to allow a user to quickly understand the context of a document. In some examples, a preview can be based on user profile data associated with the user viewing the preview (e.g., permissions associated with the user, content viewed, edited, created, etc. by the user), and the like.

In some examples, a collaborative document can be created independent of or in connection with a virtual space and/or a channel. A collaborative document can be posted in a channel and edited or interacted with as discussed herein, with various affordances or notifications indicating presence of users associated with documents and/or various interactions.

In some examples, a machine learning model can be used to determine a summary of contents of a channel and can create a collaborative document comprising the summary for posting in the channel. In some examples, the communication platform may identify the users within the virtual space, actions associated with the users, and other contributions to the conversation to generate the summary document. As such, the communication platform can enable users to create a document (e.g., a collaborative document) for summarizing content and events that transpired within the virtual space.

In some examples, documents can be configured to enable sharing of content including (but not limited to) text, images, videos, GIFs, drawings (e.g., user-generated drawings via a drawing interface), or gaming content. In some examples, users accessing a canvas can add new content or delete (or modify) content previously added. In some examples, appropriate permissions may be required for a user to add content or to delete or modify content added by a different user. Thus, for example, some users may only be able to access some or all of a document in view-only mode, while other users may be able to access some or all of the document in an edit mode allowing those users to add or modify its contents. In some examples, a document can be shared via a message in a channel, multi-person direct message, or direct message, such that data associated with the document is accessible to and/or rendered interactable for members of the channel or recipients of the multi-person direct message or direct message.

In some examples, the collaboration document pane 264 may comprise collaborative document toolbar 266 and collaborative document 268. In some examples, collaborative document toolbar 266 may provide the ability to edit or format posts, as discussed herein.

In some examples, collaborative documents may comprise free-form unstructured sections and workflow-related structured sections. In some examples, unstructured sections may include areas of the document in which a user can freely modify the collaborative document without any constraints. For example, a user may be able to freely type text to explain the purpose of the document. In some examples, a user may add a workflow or a structured workflow section by typing the name of (or otherwise mentioning) the workflow. In further examples, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some examples, structured sections may include text entry, selection menus, tables, checkboxes, tasks, calendar events, or any other document section. In further examples, structured sections may include text entry spaces that are a part of a workflow. For example, a user may enter text into a text entry space detailing a reason for approval, and then select a submit button that will advance the workflow to the next step of the workflow. In some examples, the user may be able to add, edit, or remove structured sections of the document that make up the workflow components.

In examples, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further examples, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In examples, the first user can select the plurality of collaborative documents and the "Group Information" section to effectuate permissions to access (or view, edit, etc.) to the entire user group the "Group Information" section of each of the plurality of collaborative documents.

Automation in the Group-Based Communication System

Figure 3A:
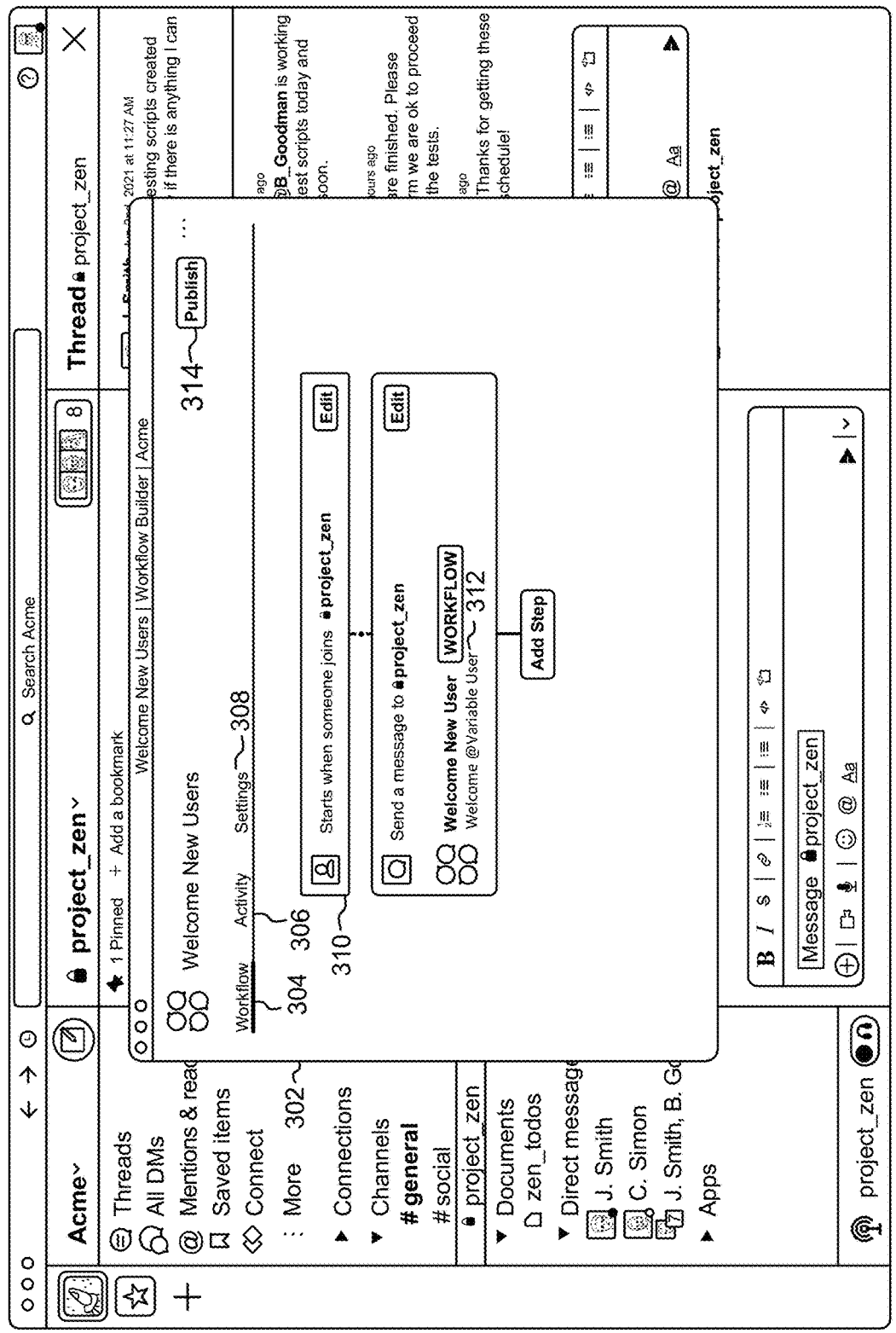
FIG. 3A depicts a user interface for workflows within a group-based communication system.

FIG. 3A illustrates user interface 300 for automation in the group-based communication system. Automation, also referred to as workflows, allow users to automate functionality within the group-based communication system. Workflow builder 302 is depicted which allows a user to create new workflows, modify existing workflows, and review the workflow activity. Workflow builder 302 may comprise a workflow tab 304, an activity tab 306, and/or a settings tab 308. In some examples, workflow builder may include a publish button 314 which permits a user to publish a new or modified workflow.

The workflow tab 304 may be selected to enable a user to create a new workflow or to modify an existing workflow. For example, a user may wish to create a workflow to automatically welcome new users who join a channel. A workflow may comprise workflow steps 310. Workflow steps 310 may comprise at least one trigger which initiates the workflow and at least one function which takes an action once the workflow is triggered. For example, a workflow may be triggered when a user joins a channel and a function of the workflow may be to post within the channel welcoming the new user. In some examples, workflows may be triggered from a user action, such as a user reacting to a message, joining a channel, or collaborating in a collaborative document, from a scheduled date and time, or from a web request from a third-party application or service. In further examples, workflow functionality may include sending messages or forms to users, channels, or any other virtual space, modifying collaborative documents, or interfacing with applications. Workflow functionality may include workflow variables 312. For example, a welcome message may include a user's name via a variable to allow for a customized message. Users may edit existing workflow steps or add new workflow steps depending on the desired workflow functionality. Once a workflow is complete, a user may publish the workflow using publish button 314. A published workflow will wait until it is triggered, at which point the functions will be executed.

Activity tab 306 may display information related to a workflow's activity. In some examples, the activity tab 306 may show how many times a workflow has been executed. In further examples, the activity tab 306 may include information related to each workflow execution including the status, last activity date, time of execution, user who initiated the workflow, and other relevant information. The activity tab 306 may permit a user to sort and filter the workflow activity to find useful information.

A settings tab 308 may permit a user to modify the settings of a workflow. In some examples, a user may change a title or an icon associated with the workflow. Users may also manage the collaborators associated with a workflow. For example, a user may add additional users to a workflow as collaborators such that the additional users can modify the workflow. In some examples, settings tab 308 may also permit a user to delete a workflow.

Figure 3B:
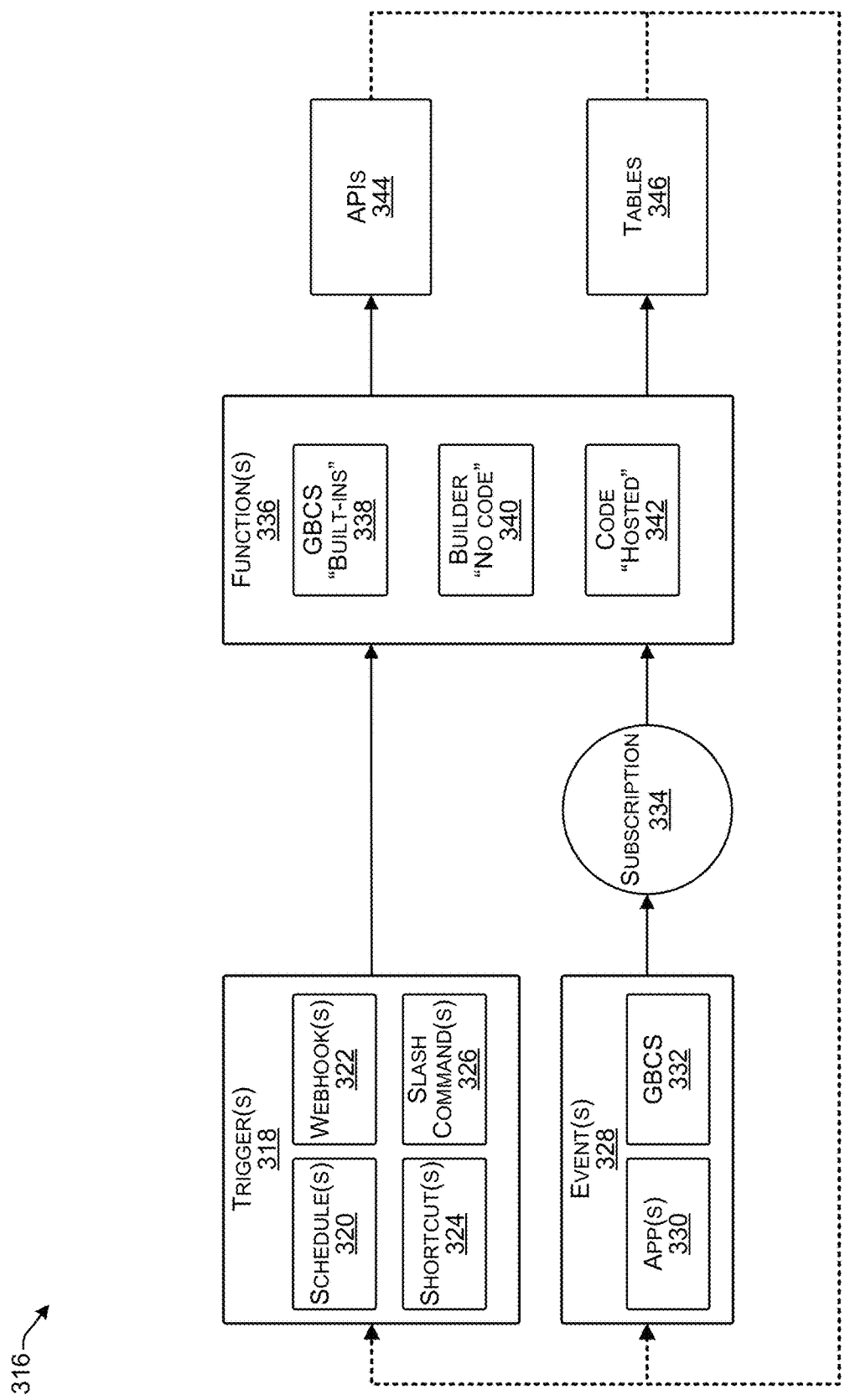
FIG. 3B depicts a block diagram for carrying out certain examples, as discussed herein.

FIG. 3B depicts elements related to workflows in the group-based communication system and is referred to generally by reference numeral 316. In various examples, trigger(s) 318 can be configured to invoke execution of function(s) 336 responsive to user instructions. A trigger initiates function execution and may take the form of one or more schedule(s) 320, webhook(s) 322, shortcut(s) 324, and/or slash command(s) 326. In some examples, the schedule 320 operates like a timer so that a trigger may be scheduled to fire periodically or once at a predetermined point in the future. In some examples, an end user of an event-based application sets an arbitrary schedule for the firing of a trigger, such as once-an-hour or every day at 9:15 AM.

Additionally, triggers 318 may take the form of the webhook 322. The webhook 322 may be a software component that listens at a webhook URL and port. In some examples, a trigger fires when an appropriate HTTP request is received at the webhook URL and port. In some examples, the webhook 322 requires proper authentication such as by way of a bearer token. In other examples, triggering will be dependent on payload content.

Another source of one of the trigger(s) 318 is a shortcut in the shortcut(s) 324. In some examples, the shortcut(s) 324 may be global to a group-based communication system and are not specific to a group-based communication system channel or workspace. Global shortcuts may trigger functions that are able to execute without the context of a particular group-based communication system message or group-based communication channel. By contrast, message- or channel-based shortcuts are specific to a group-based communication system message or channel and operate in the context of the group-based communication system message or group-based communication channel.

A further source of one of triggers 318 may be provided by way of slash commands 326. In some examples, the slash command(s) 326 may serve as entry points for group-based communication system functions, integrations with external services, or group-based communication system message responses. In some examples, the slash commands 326 may be entered by a user of a group-based communication system to trigger execution of application functionality. Slash commands may be followed by slash-command-line parameters that may be passed along to any group-based communication system function that is invoked in connection with the triggering of a group-based communication system function such as one of functions 336.

An additional way in which a function is invoked is when an event (such as one of events 328) matches one or more conditions as predetermined in a subscription (such as subscription 334). Events 328 may be subscribed to by any number of subscriptions 334, and each subscription may specify different conditions and trigger a different function. In some examples, events are implemented as group-based communication system messages that are received in one or more group-based communication system channels. For example, all events may be posted as non-user visible messages in an associated channel, which is monitored by subscriptions 334. App events 330 may be group-based communication system messages with associated metadata that are created by an application in a group-based communication system channel. Events 328 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may be able to post messages and upload files as well as be invited or removed from both public and private channels in a group-based communication system.

Events 328 may also be any event associated with a group-based communication system. Such group-based communication system events 332 include events relating to the creation, modification, or deletion of a user account in a group-based communication system or events relating to messages in a group-based communication system channel, such as creating a message, editing or deleting a message, or reacting to a message. Events 328 may also relate to creation, modification, or deletion of a group-based communication system channel or the membership of a channel. Events 328 may also relate to user profile modification or group creation, member maintenance, or group deletion.

As described above, subscription 334 indicates one or more conditions that, when matched by events, trigger a function. In some examples, a set of event subscriptions is maintained in connection with a group-based communication system such that when an event occurs, information regarding the event is matched against a set of subscriptions to determine which (if any) of functions 336 should be invoked. In some examples, the events to which a particular application may subscribe are governed by an authorization framework. In some instances, the event types matched against subscriptions are governed by OAuth permission scopes that may be maintained by an administrator of a particular group-based communication system.

In some examples, functions 336 can be triggered by triggers 318 and events 328 to which the function is subscribed. Functions 336 take zero or more inputs, perform processing (potentially including accessing external resources), and return zero or more results. Functions 336 may be implemented in various forms. First, there are group-based communication system built-ins 338, which are associated with the core functionality of a particular group-based communication system. Some examples include creating a group-based communication system user or channel. Second are no-code builder functions 340 that may be developed by a user of a group-based communication system user in connection with an automation user interface such as workflow builder user interface. Third, there are hosted-code functions 342 that are implemented by way of group-based communication system applications developed as software code in connection with a software development environment.

These various types of functions 336 may in turn integrate with APIs 344. In some examples, APIs 344 are associated with third-party services that functions 336 employ to provide a custom integration between a particular third-party service and a group-based communication system. Examples of third-party service integrations include video conferencing, sales, marketing, customer service, project management, and engineering application integration. In such an example, one of the triggers 318 would be a slash command 326 that is used to trigger a hosted-code function 342, which makes an API call to a third-party video conferencing provider by way of one of the APIs 344. As shown in FIG. 3B, the APIs 344 may themselves also become a source of any number of triggers 318 or events 328. Continuing the above example, successful completion of a video conference would trigger one of the functions 336 that sends a message initiating a further API call to the third-party video conference provider to download and archive a recording of the video conference and store it in a group-based communication system channel.

In addition to integrating with APIs 344, functions 336 may persist and access data in tables 346. In some examples, tables 346 are implemented in connection with a database environment associated with a serverless execution environment in which a particular event-based application is executing. In some instances, tables 346 may be provided in connection with a relational database environment. In other examples, tables 346 are provided in connection with a database mechanism that does not employ relational database techniques. As shown in FIG. 3B, in some examples, reading or writing certain data to one or more of tables 346, or data in table matching predefined conditions, is itself a source of some number of triggers 318 or events 328. For example, if tables 346 are used to maintain ticketing data in an incident-management system, then a count of open tickets exceeding a predetermined threshold may trigger a message being posted in an incident-management channel in the group-based communication system.

Figure 4:
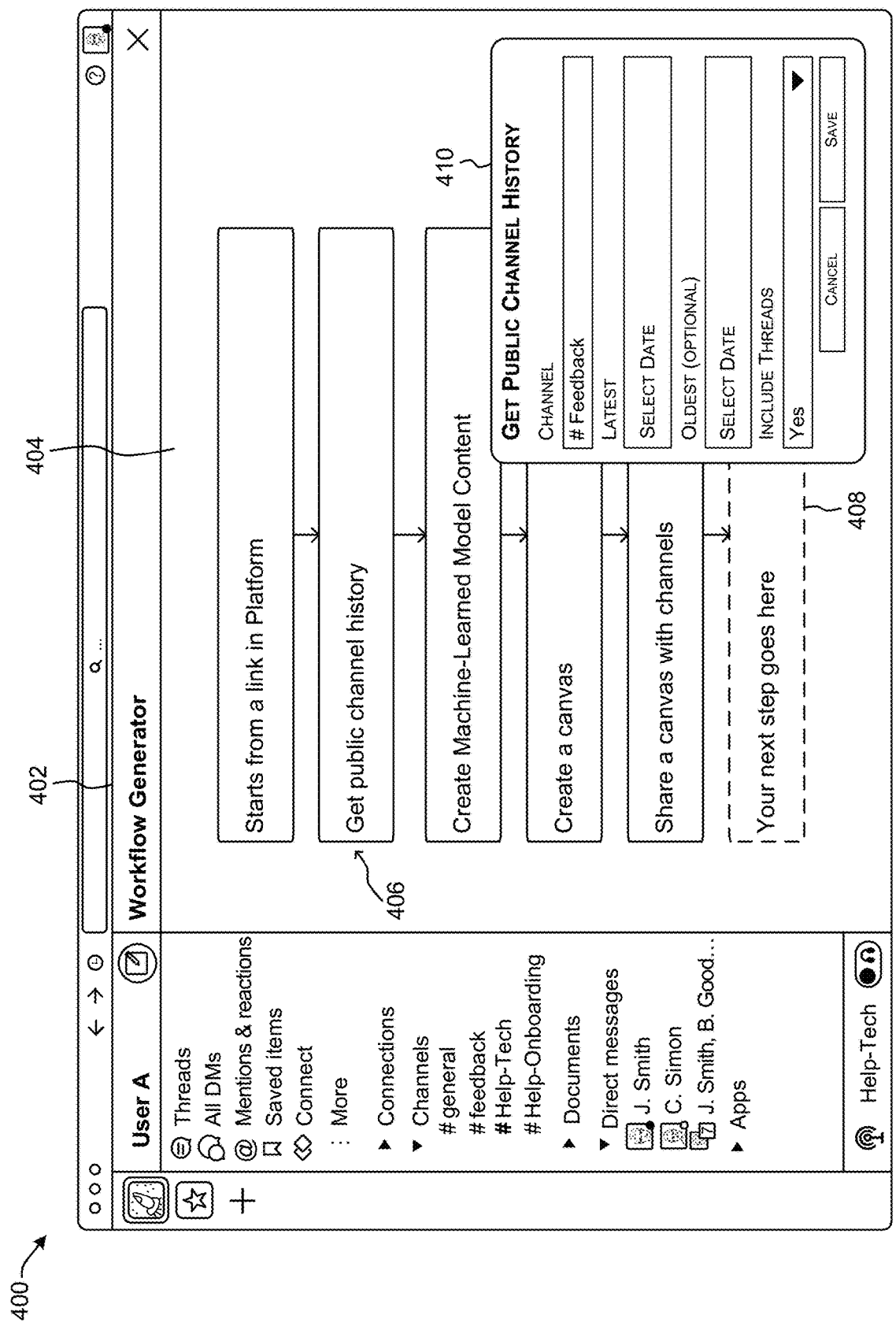
FIG. 4 illustrates an example user interface associated with a communication platform displaying a workflow consisting of multiple modular functions.

FIG. 4 illustrates an example user interface 400 associated with a communication platform displaying a workflow consisting of multiple modular functions.

In some examples, the example user interface 400 may be similar or identical to the example user interfaces of FIGS. 1-3. As described below, the example user interface 400 may include multiple modular functions corresponding to a canvas virtual space. In some examples, the example user interface 400 may include a workflow pane 402. As described above, the workflow pane 402 may describe the purpose and/or intent of the workflow. That is, the workflow pane 402 may describe the task that the user is creating the workflow to automate. In this example, the workflow pane 402 indicates that the user is attempting to generate a workflow new workflow.

In some examples, the example user interface 400 may include a workflow builder pane 404. The workflow builder pane 404 may be a portion of the example user interface 400 in which a user profile can build a workflow using a variety of modular functions 406. In some examples, the workflow builder pane 404 may include one or more modular functions 406 that, when executed together, can automate a task. That is, the modular functions 406 in the workflow builder pane 404 may perform operations specific to automating a feedback synthesizing operation. As shown, the modular functions 406 may include starting from a link in the platform (e.g., by a user profile selecting a workflow notification), getting public channel history (e.g., retrieve the feedback data being stored within a channel), creating a machine-learning model response (e.g., instructing the machine-learning models to synthesize data (received by the get public channel history module)), creating a canvas, and/or sharing a canvas. Accordingly, when the task of synthesizing feedback is performed by executing the workflow, the communication platform may execute each modular function 406 each of which is configured to perform a portion of the overall task. Of course, this is merely an example; in other examples, there may be more or less modular functions 406 configured to perform similar or different operations. In some examples, the workflow builder pane 404 may include a location 408 in which a user profile may add additional modular function to assist in performing the task. The user profile may add any type of modular function (e.g., machine-learning modular functions, virtual space specific modular functions, communication platform modular functions, etc.) to the location 408.

As shown in FIG. 4, some or all of the modular functions 406, as described above, may be customizable and/or modifiable. For instance, a user profile building the workflow may select a modular function which may display an interface enabling the user profile to modify how the communication platform is to execute the modular function. As shown, the user profile may select the "get public channel history" modular function. Upon selecting the modular function, the communication platform may render or otherwise display a user interface 410 (e.g., overlay window) containing a variety of modifying options. The user interface 410 may include an option to specify which channel the workflow will access to retrieve the feedback data. In this example, the user interface 410 indicates that the communication platform may retrieve the feedback from the "#feedback" channel. Of course, in other examples, the user interface 410 may retrieve the feedback from a different channel. Further, the user interface 410 may include an option to modify how recent of data the communication platform is to retrieve. That is, in some cases, the user profile may select that it wants to synthesize feedback receive only within the last two months. As such, the user profile may modify such options (or fields) in the user interface 410 to indicate that the communication platform is to retrieve feedback received during the last two months. The user interface 410 also includes an option to include data stored in threads. That is, when selected, the communication platform may retrieve data from the "#feedback" channel and any of the threads therein. Though this example is with respect to the get public channel history, some or all of the other modular functions may be modifiable as well.

Figure 5:
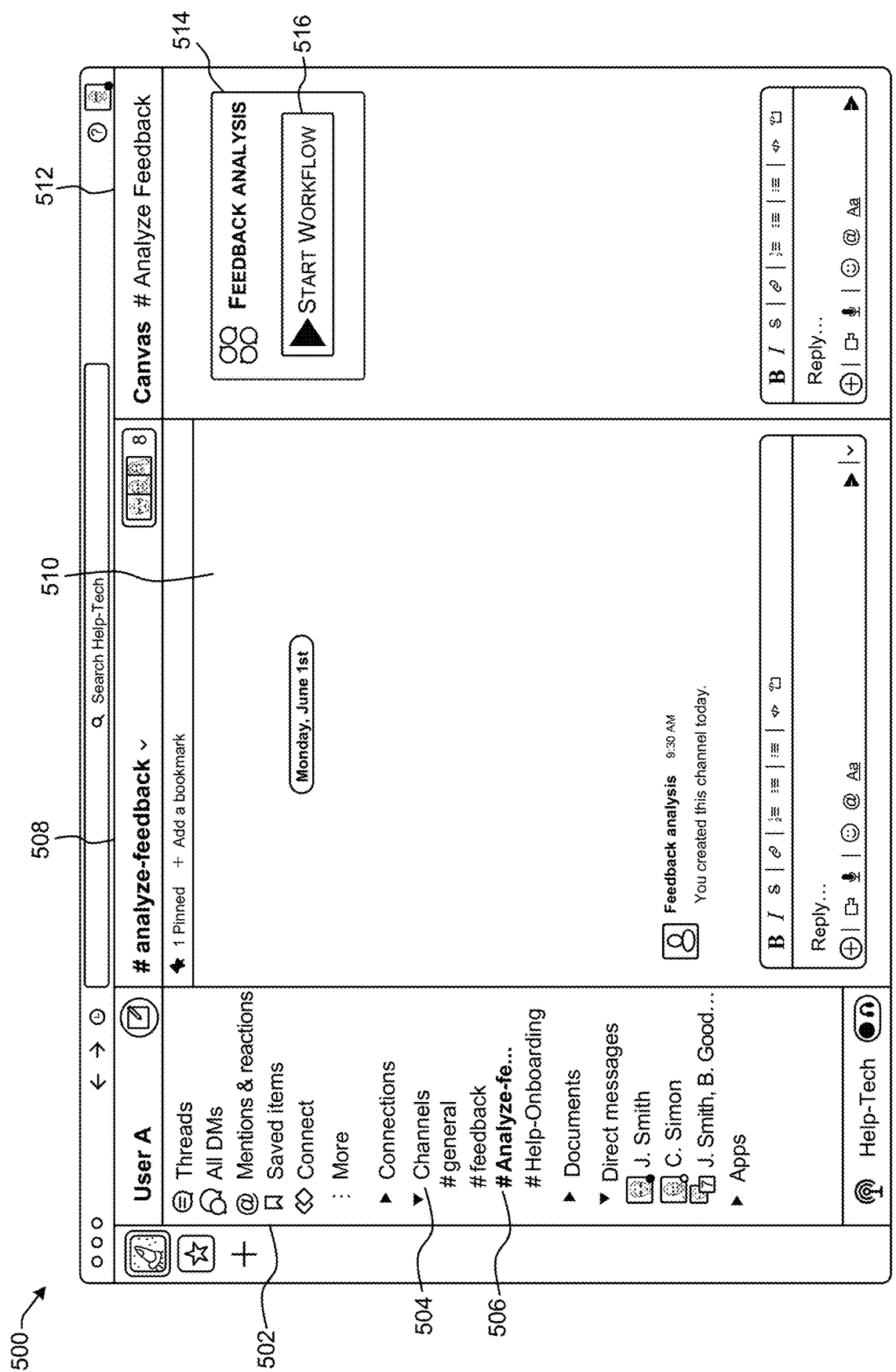
FIG. 5 illustrates an example user interface associated with a communication platform for enabling a user profile to execute a workflow configured to synthesize data.

FIG. 5 illustrates an example user interface 500 associated with a communication platform for enabling a user profile to execute a workflow configured to synthesize data.

In some examples, the example user interface 500 may be similar or identical to the example user interfaces of FIGS. 1-4. As described below, the example user interface 500 may include a channel within which a user profile may request that the communication platform perform a synthesizing operation on feedback. In some examples, the example user interface 500 may include a navigation pane 502. As described above, the navigation pane 502 may present different data and/or options to a user. In some examples, the navigation pane 502 may include different graphical indicators which may be associated with a variety of virtual spaces, such as channels 504. The example user interface 500 may include any number of channels 504 which may be used to organize conversations between and amongst users according to topics. In some examples, the example user interface 500 may include channels 504 such as a general channel, a feedback channel, a analyze-feedback channel 506, and/or any other channel. When a user selects a channel 504, a channel pane 508 may be presented. In some examples, the channel pane 508 can include access to content associated with the channel, in addition to enabling users to add other members, post content, and the like.

In some examples, the example user interface 500 may include a message viewing pane 510 to view messages that have been posted by one or more users associated with the analyze-feedback channel 506. Further, the user interface 500 may include a canvas pane 512 containing information specific to the associated channel, specifically the analyze-feedback channel 506. As shown, the canvas pane 512 may include a workflow interface 514. In some examples, the workflow interface 514 be configured to synthesize feedback stored within the feedback channel. The workflow interface 514 may be a representation of the workflow described in FIG. 4. In some examples, the workflow interface 514 may include an actionable interface element 516 that, upon being selected (or clicked on), may send a request to the communication platform to execute the workflow. That is, the communication platform may receive user input data indicative of a request to execute the workflow. In such instances, the communication platform may cause each of the modular functions within the workflow to be executed.

Figure 6:
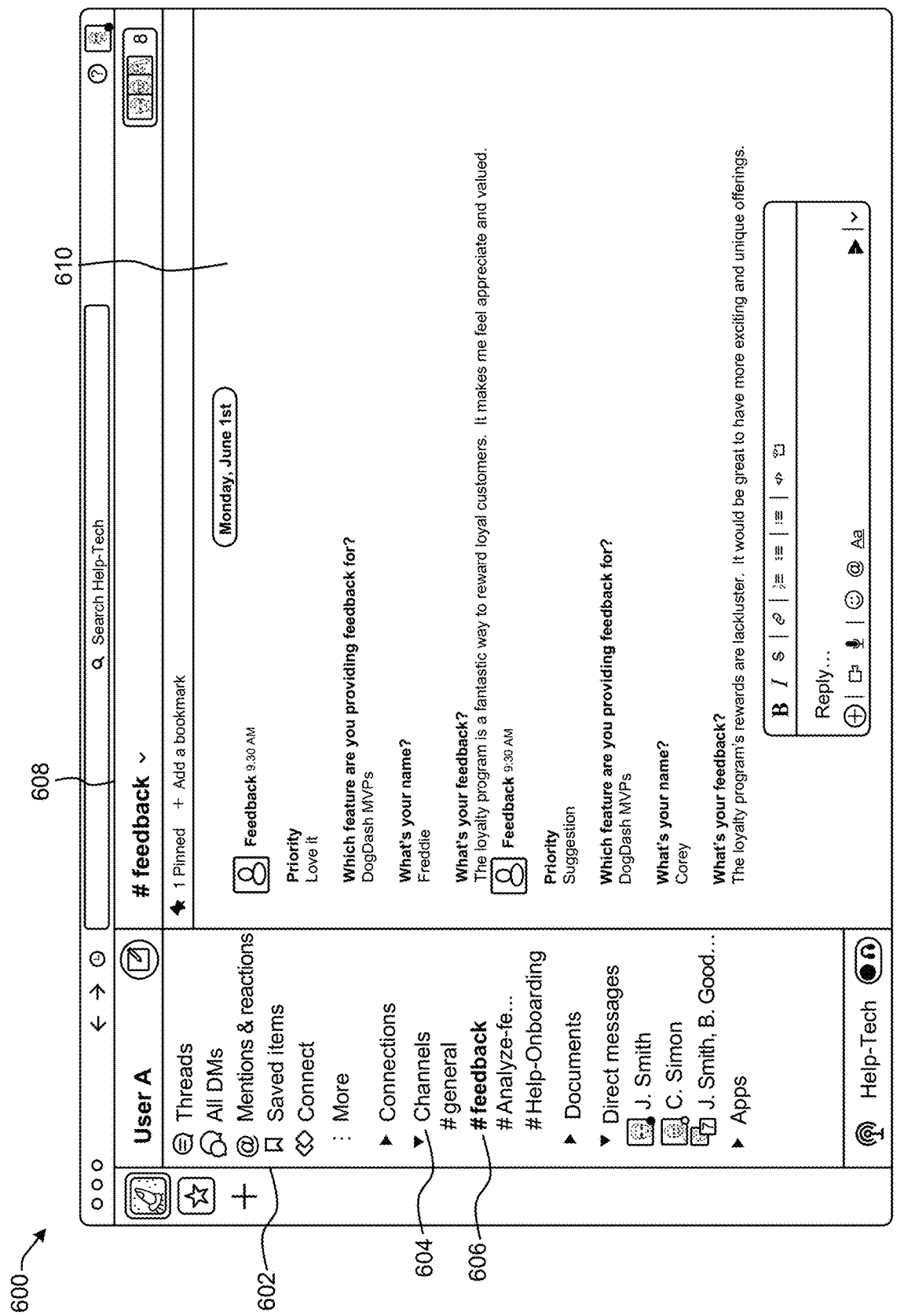
FIG. 6 illustrates an example user interface associated with a communication platform displaying a virtual space containing feedback from a plurality of user profiles.

FIG. 6 illustrates an example user interface 600 associated with a communication platform displaying a virtual space containing feedback from a plurality of user profiles.

In some examples, the example user interface 600 may be similar or identical to the example user interfaces of FIGS. 1-5. As described below, the example user interface 600 may include a channel within which feedback from one or more user profiles and/or entities is stored. In some examples, the example user interface 600 may include a navigation pane 602. As described above, the navigation pane 602 may present different data and/or options to a user. In some examples, the navigation pane 602 may include different graphical indicators which may be associated with a variety of virtual spaces, such as channels 604. The example user interface 600 may include any number of channels 604 which may be used to organize conversations between and amongst users according to topics. In some examples, the example user interface 600 may include channels 604 such as a general channel, a feedback channel 606, a analyze-feedback channel, and/or any other channel. When a user selects a channel 604, a channel pane 608 may be presented. In some examples, the channel pane 608 can include access to content associated with the channel, in addition to enabling users to add other members, post content, and the like.

In some examples, the example user interface 600 may include a message viewing pane 610 to view messages that have been posted by one or more users associated with the feedback channel 606. In this example, the message viewing pane 610 may include various types of data. Specifically, the message viewing pane 610 may include one or more responses (e.g., feedback) to a survey. That is, as noted above, a user profile may send survey to one or more user profiles and/or entities to solicit feedback regarding one or more topics. In such instances, the feedback from such intended recipients may be input directly to the feedback channel 606 or may be integrated into the feedback channel 606. In some examples, a user profile may request to have such feedback data to be synthesized. Accordingly, the communication platform may retrieve the data to be synthesized by accessing the feedback channel 606 and inputting the data stored therein into a machine-learning model trained to output data a synthesized representation of the data displayed in the message viewing pane 610.

Figure 7:
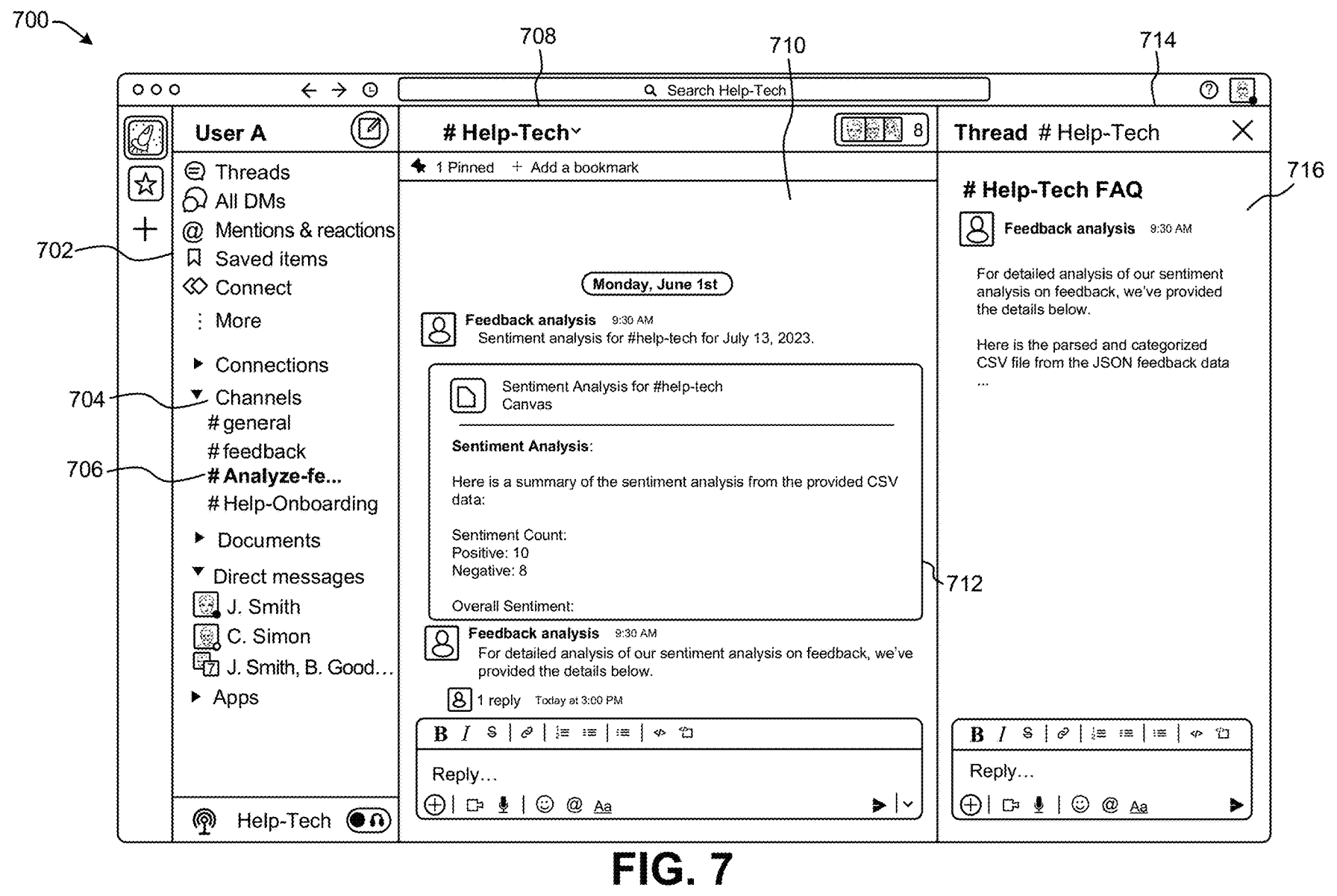

FIG. 7 illustrates an example user interface 700 associated with a communication platform for enabling a user to engage a machine-learning model to synthesize feedback provided by a plurality of users of a virtual space.

In some examples, the example user interface 700 may be similar or identical to the example user interfaces of FIGS. 1-6. As described below, the example user interface 700 may include a document containing a summary of feedback provided by the one or more users of the channel. In some examples, the example user interface 700 may include a navigation pane 702. As described above, the navigation pane 702 may present different data and/or options to a user. In some examples, the navigation pane 702 may include different graphical indicators which may be associated with a variety of virtual spaces, such as channels 704. The example user interface 700 may include any number of channels 704 which may be used to organize conversations between and amongst users according to topics. In some examples, the example user interface 700 may include channels 704 such as a general channel, a social channel, a help-tech channel 706 and/or any other channel. When a user selects a channel 704, a channel pane 708 may be presented. In some examples, the channel pane 708 can include access to content associated with the channel, in addition to enabling users to add other members, post content, and the like.

In some examples, the example user interface 700 may include a message viewing pane 710 to view messages that have been posted by one or more users associated with the help-tech channel 706. As shown in FIG. 7, the message viewing pane 710 may include a document 712 containing a summary of data received by users belonging to one or more virtual spaces. That is, the communication platform may send a request (e.g., survey) to one or more users belonging to one or more virtual spaces or to one or more user profiles external to the communication platform requesting that such users provide feedback regarding a variety of topics. In such instances, the communication platform may request such feedback by sending individualized requests, creating a feedback virtual space in which users may post their feedback, or by sending specific questions for users to answer. In such instances, upon receiving the user responses to the feedback, the communication platform may input some or all the user responses to a machine-learning model trained to output a synthesized representation of the user responses. In such instances, the communication platform may receive the synthesized representation of the user responses and incorporate such data into a document. However, in other examples, the machine-learning model may output the synthesized representation in a document. The communication platform may render the document to the virtual space.

As shown in FIG. 7, the example user interface 700 may include a document 712 titled "Sentiment Analysis for #help-tech". Of course, in other examples the document may include a different title. As shown, the document 712 may display a portion (e.g., less than all) of the synthesized data. Accordingly, a user profile of the help-tech channel 706 may access the entirety of the synthesized data by selecting the document 712. That is, the document 712 may be an actionable user interface element that, upon being selected, may cause the entirety of the synthesized data to be displayed via a user interface of the communication platform. Additional details regarding interacting with the document 712 are discussed in FIG. 8. Further, the example user interface 700 may include a thread pane 714 containing a pane 716 that includes additional data regarding the synthesized user responses. As shown, the thread pane 714 may correspond to the help-tech channel 706. In such instances, the pane 716 may include data linked to one or more third party systems. The data within the pane 716 may include a link, document, and/or spreadsheet configured to represent the data in various ways. As such, a user viewing the synthesized feedback may access a link in the pane 716 which may direct them to a spreadsheet (e.g., first party spreadsheet or third party spreadsheet) containing a detailed analysis of the user feedback. In some examples, a spreadsheet may include any category for rows and columns. Some examples of row and/or column categories may include a feedback category, a revenue value, an expense value, a customer identifier, a requested data, and/or any other category.

Accordingly, the communication platform may use one or more machine-learning models to automate a user feedback synthesizing process.

FIG. 8 illustrates an example user interface 800 associated with a communication platform displaying a document containing synthesized data and generated by a machine-learning model.

In some examples, the example user interface 800 may be similar or identical to the example user interfaces of FIGS. 1-7. As described below, the example user interface 800 may include a channel within which synthesized feedback may be viewed. In some examples, the example user interface 800 may include a navigation pane 802. As described above, the navigation pane 802 may present different data and/or options to a user. In some examples, the navigation pane 802 may include different graphical indicators which may be associated with a variety of virtual spaces, such as channels 804. The example user interface 800 may include any number of channels 604 which may be used to organize conversations between and amongst users according to topics. In some examples, the example user interface 800 may include channels 804 such as a general channel, a feedback channel, a analyze-feedback channel 806, and/or any other channel. When a user selects a channel 804, a channel pane 808 may be presented. In some examples, the channel pane 808 can include access to content associated with the channel, in addition to enabling users to add other members, post content, and the like.

In some examples, the example user interface 800 may include a message viewing pane 810 containing synthesized data. That is, the message viewing pane 810 may include an entirety of the synthesized data described in FIG. 7. As noted in FIG. 7, the communication platform may synthesize feedback and cause such synthesized feedback to be displayed via the document 712. In such instances, a user profile may intent to view the entirety of the synthesized feedback and as such, the user profile may select the document 712 which may cause the communication platform to display the synthesized feedback in its entirety. As shown in FIG. 8, the synthesized feedback may be a synthesized representation of the data stored in the feedback channel 606 in FIG. 6. As shown, the synthesized feedback indicates the sentiment count (e.g., the positive or negative indication) along with key issue areas. In such cases, the synthesized feedback may enable user profiles more time to analyze the synthesized feedback rather than spending excessive amounts of time synthesizing the feedback.

Figure 9:
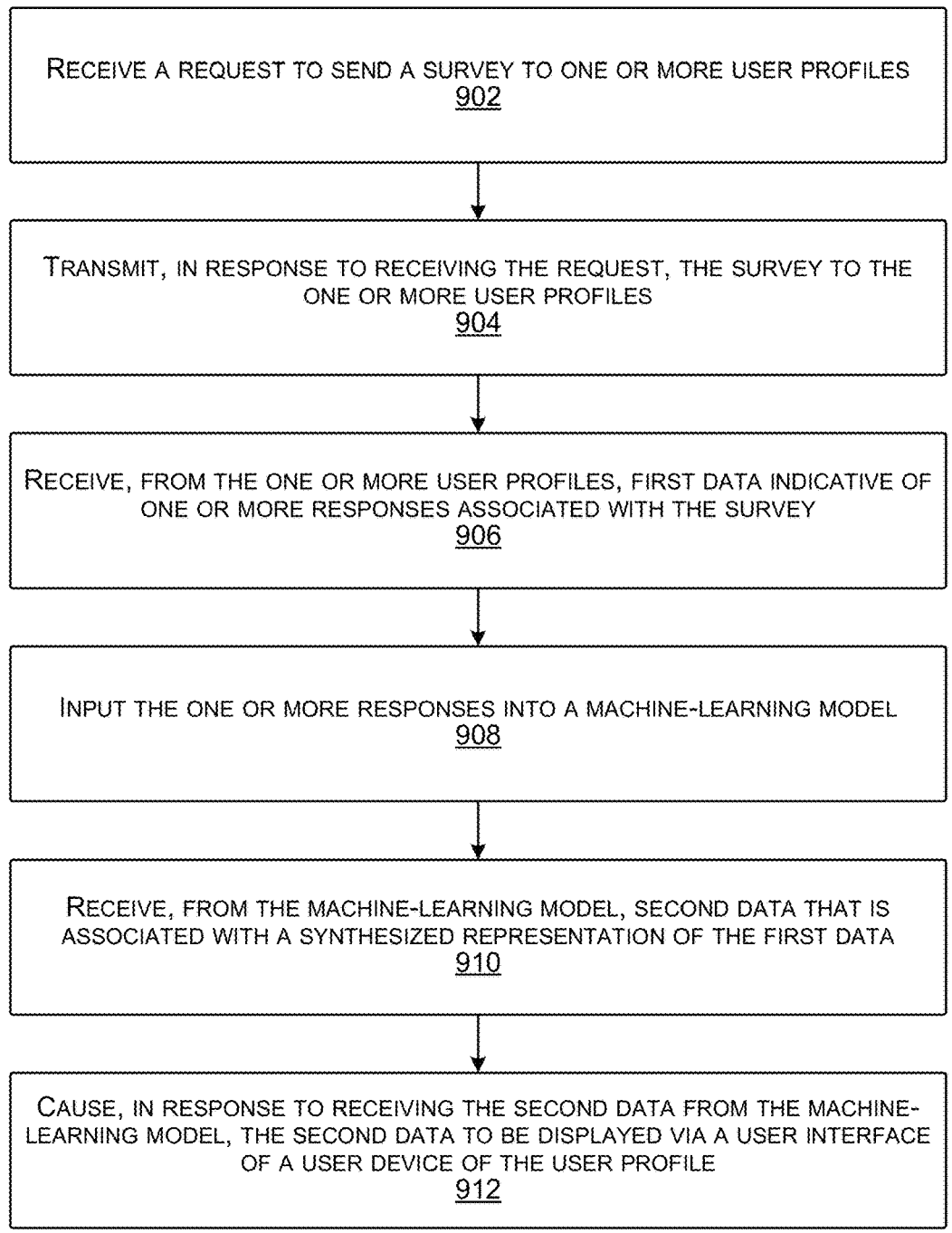
FIG. 9 is a flow diagram illustrating an example process for receiving user feedback, receiving a request to synthesize the user feedback, generating synthesized feedback using a machine-learning model, causing the synthesized feedback to be displayed via a user interface.

FIG. 9 is a flow diagram illustrating an example process 900 for receiving user feedback, receiving a request to synthesize the user feedback, generating synthesized feedback using a machine-learning model, causing the synthesized feedback to be displayed via a user interface. The processes illustrated in FIG. 9 is described with reference to components described above with reference to the example environment 100 shown in FIG. 1 for convenience and ease of understanding. However, the processes illustrated in FIG. 9 is not limited to being performed using the components described above with reference to the example environment 100. Moreover, the components described above with reference to the example environment 100 are not limited to performing the processes illustrated in FIG. 9.

Process 900 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 902, the process 900 can include receiving a request to send a survey to one or more user profiles. In some examples, the communication platform may receive, from a user profile, a request that includes instructions to send a survey to one or more user profiles (e.g., members of a virtual space, administrative user profiles, etc.) and/or entities (e.g., companies, organizations, departments, etc.). That is, a user profile may request that various user profiles and/or entities (e.g., external to the communication platform or internal to the communication platform) provide feedback concerning one or more topics, features, products, services, and/or concepts. A survey may be a questionnaire, a question, a form to fill out, a virtual space containing one or more questions, etc. As an example, a user profile may have launched a new product and wants to receive feedback about how various aspects of the product function. Alternatively, an entity may want to receive feedback from customers regarding the quality of its services. In such cases, the user profile or entity may send one or more surveys (e.g., questionnaire, forms, etc.) that includes options for the recipient to provide the desired feedback. That is, the request received by the communication platform may include the type of survey to send and/or the one or more user profiles and/or entities (e.g., recipient user profiles and/or recipient entities) to which the survey is to be sent.

At operation 904, the process 900 can include transmitting, in response to receiving the request, the survey to the one or more user profiles. Based on receiving the request, the communication platform may send a survey to the intended recipients. Depending on the type of survey, the communication platform may send various types of data. For example, if the survey is a virtual space that includes one or more questions to answer, the communication platform may send an invitation to join the virtual space. If the survey is a document, form, or link, the communication platform may send the document, form, or link via a messaging system (e.g., email, direct messaging instance, etc.). As such, the recipient(s) may receive access to the survey.

At operation 906, the process 900 can include receiving, form the one or more user profiles, first data indicative of one or more responses associated with the survey. In some examples, the communication platform may receive feedback from the intended recipients. Based on receiving the survey from the communication platform, the intended recipient(s) of the survey may provide one or more responses to the one or more prompts within the survey. In such instances, the one or more responses may be feedback. The communication platform may store the feedback in a virtual space (e.g., a channel, a direct messaging instance, a multiparty direct messaging instance, a board, etc.), a document, a file, etc. In such instances, one or more user profiles of the communication platform may access the feedback and determine a manner in which to process such data.

At operation 908, the process 900 can include inputting the one or more responses into a machine-learning model. In some examples, based on receiving the feedback, the communication platform may input the feedback into a machine-learning model trained to generate synthesized data. The communication platform may include one or more machine-learning models trained to perform a synthesizing operation. In some instances, the machine-learning models may be large language models (or LLMs). Upon identifying the data to synthesize, the communication platform may provide the data as input into the machine-learning model(s) trained to output content that may be a synthesized representation of the data (or feedback) input to the machine-learning model(s).

At operation 910, the process 900 can include receiving, from the machine-learning model, second data that is associated with a synthesized representation of the first data. In some examples, the output content of the machine-learning model may be a file that contains the synthesized data, a document that includes the synthesized data, a link to a virtual space that includes the synthesized data, the virtual space that includes the synthesized data, etc.

At operation 912, the process 900 can include causing, in response to receiving the second data from the machine-learning model, the second data to be displayed via a user interface of a user device of the user profile. The communication platform may cause the synthesized data to be displayed at one or more locations within the communication platform. In some examples, the communication platform may display the synthesized data via a separate interface such as an overlay interface, a popup box, and/or any other type of interface. For example, the synthesized feedback may be stored within a document. In such instances, the communication platform may render the document as a overlay notification. The overlay notification may display a portion of the synthesized data (e.g., a preview of the synthesized data).

EXAMPLE CLAUSES

A: A system comprising: one or more processors; and one or more non-transitory computer-readable media storing computer-executable instructions that, when executed, cause the system to perform operations comprising: receiving, from a first user profile associated with a user of a communication platform, a first request to send a survey to one or more user profiles; transmitting, in response to receiving the first request, the survey to the one or more user profiles; receiving, from the one or more user profiles, first data indicative of one or more responses associated with the survey; receiving, from a second user profile, a second request to synthesize the one or more responses; inputting, based at least in part on the second request, the one or more responses into a machine-learning model trained to output second data consistent with a synthesized representation of the first data; receiving, from the machine-learning model, the second data that is associated with the synthesized representation of the first data; and causing, in response to receiving the second data from the machine-learning model, the second data to be displayed via a user interface of a user device of the second user profile.

B: The system of paragraph A, wherein receiving the second request comprises: generating, based on input from the second user profile, a workflow configured to execute a process to synthesize the one or more responses; and receiving, from the second user profile, user input data including one or more instructions to execute the workflow.

C: The system of paragraph B, wherein generating the workflow is based at least in part on: receiving, from the second user profile, a first modular function configured retrieve content from a virtual space; receiving, from the second user profile, a second modular function configured to input the content into a machine-learning model; and receiving, from the second user profile, a third modular function configured to display an output of the machine-learning model to the user interface.

D: The system of paragraph A, wherein the user interface is an overlay user interface and a portion of the second data is displayed within the overlay user interface, the operations further comprising: receiving, from the second user profile, user input data indicative of a selection of the portion of the second data; and causing, in response to the user input data, an entirety of the second data to be displayed via a second user interface of the communication platform.

E: The system of paragraph A, wherein the second data is at least one of: a file, a document, a link, or a second virtual space.

F: The system of paragraph A, wherein the one or more user profiles are external to the communication platform.

G: One or more non-transitory computer-readable media storing instructions executable by one or more processors, wherein the instructions, when executed, cause a system to perform operations comprising: receiving, from a user profile associated with a user of a communication platform, a request to send a survey to one or more user profiles; transmitting, in response to receiving the request, the survey to the one or more user profiles; receiving, from the one or more user profiles, first data indicative of one or more responses associated with the survey; inputting the one or more responses into a machine-learning model trained to output second data consistent with a synthesized representation of the first data; receiving, from the machine-learning model, the second data that is associated with the synthesized representation of the first data; and causing, in response to receiving the second data from the machine-learning model, the second data to be displayed via a user interface of a user device of the user profile.

H: The one or more non-transitory computer-readable media of paragraph G, wherein the user interface is an overlay user interface and a portion of the second data is displayed within the overlay user interface, the operations further comprising: receiving, from the user profile, user input data indicative of a selection of the portion of the second data; and causing, in response to the user input data, an entirety of the second data to be displayed via a second user interface of the communication platform.

I: The one or more non-transitory computer-readable media of paragraph G, wherein the one or more user profiles are external to the communication platform.

J: The one or more non-transitory computer-readable media of paragraph G, wherein the second data is at least one of: a file, a document, a link, or a second virtual space.

K: The one or more non-transitory computer-readable media of paragraph G, wherein the user profile is a first user profile and the request is a first request, wherein inputting the one or more responses into the machine-learning model is based at least in part on: receiving, from a second user profile, a second request to synthesize the one or more responses; and inputting, in response to receiving the second request, the one or more responses into the machine-learning model.

L: The one or more non-transitory computer-readable media of paragraph K, wherein receiving the second request comprises: generating, based on input from the second user profile, a workflow configured to execute a process to synthesize the one or more responses; and receiving, from the second user profile, user input data including one or more instructions to execute the workflow.

M: The one or more non-transitory computer-readable media of paragraph L, wherein generating the workflow is based at least in part on: receiving, from the second user profile, a first modular function configured retrieve content from a virtual space; receiving, from the second user profile, a second modular function configured to input the content into a machine-learning model; and receiving, from the second user profile, a third modular function configured to display an output of the machine-learning model to the user interface.

N: A method comprising: receiving, from a user profile associated with a user of a communication platform, a request to send a survey to one or more user profiles; transmitting, in response to receiving the request, the survey to the one or more user profiles; receiving, from the one or more user profiles, first data indicative of one or more responses associated with the survey; inputting the one or more responses into a machine-learning model trained to output second data consistent with a synthesized representation of the first data; receiving, from the machine-learning model, the second data that is associated with the synthesized representation of the first data; and causing, in response to receiving the second data from the machine-learning model, the second data to be displayed via a user interface of a user device of the user profile.

O: The method of paragraph N, wherein the user interface is an overlay user interface and a portion of the second data is displayed within the overlay user interface, further comprising: receiving, from the user profile, user input data indicative of a selection of the portion of the second data; and causing, in response to the user input data, an entirety of the second data to be displayed via a second user interface of the communication platform.

P: The method of paragraph N, wherein the one or more user profiles are external to the communication platform.

Q: The method of paragraph N, wherein the second data is at least one of: a file, a document, a link, or a second virtual space.

R: The method of paragraph N, wherein the user profile is a first user profile and the request is a first request, wherein inputting the one or more responses into the machine-learning model is based at least in part on: receiving, from a second user profile, a second request to synthesize the one or more responses; and inputting, in response to receiving the second request, the one or more responses into the machine-learning model.

S: The method of paragraph R, wherein receiving the second request comprises: generating, based on input from the second user profile, a workflow configured to execute a process to synthesize the one or more responses; and receiving, from the second user profile, user input data including one or more instructions to execute the workflow.

T: The method of paragraph S, wherein generating the workflow is based at least in part on: receiving, from the second user profile, a first modular function configured retrieve content from a virtual space; receiving, from the second user profile, a second modular function configured to input the content into a machine-learning model; and receiving, from the second user profile, a third modular function configured to display an output of the machine-learning model to the user interface.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the system to perform operations comprising:
receiving, from a first user profile associated with a user of a communication platform, a first request to send a survey to one or more user profiles;

transmitting, in response to receiving the first request, the survey to the one or more user profiles;
receiving, from the one or more user profiles, first data indicative of one or more responses associated with the survey;
receiving, from a second user profile, a second request to synthesize the one or more responses;
inputting, based at least in part on the second request, the one or more responses into a machine-learning model trained to output second data consistent with a synthesized representation of the first data;
receiving, from the machine-learning model, the second data that is associated with the synthesized representation of the first data; and
causing, in response to receiving the second data from the machine-learning model, the second data to be displayed via a user interface of a user device of the second user profile.

2. The system of claim 1, wherein receiving the second request comprises:
generating, based on input from the second user profile, a workflow configured to execute a process to synthesize the one or more responses; and
receiving, from the second user profile, user input data including one or more instructions to execute the workflow.

3. The system of claim 2, wherein generating the workflow is based at least in part on:
receiving, from the second user profile, a first modular function configured retrieve content from a virtual space;
receiving, from the second user profile, a second modular function configured to input the content into a machine-learning model; and
receiving, from the second user profile, a third modular function configured to display an output of the machine-learning model to the user interface.

4. The system of claim 1, wherein the user interface is an overlay user interface and a portion of the second data is displayed within the overlay user interface, the operations further comprising:
receiving, from the second user profile, user input data indicative of a selection of the portion of the second data; and
causing, in response to the user input data, an entirety of the second data to be displayed via a second user interface of the communication platform.

5. The system of claim 1, wherein the second data is at least one of:
a file,
a document,
a link, or
a second virtual space.

6. The system of claim 1, wherein the one or more user profiles are external to the communication platform.

7. One or more non-transitory computer-readable media storing instructions executable by one or more processors, wherein the instructions, when executed, cause a system to perform operations comprising:
receiving, from a user profile associated with a user of a communication platform, a request to send a survey to one or more user profiles;
transmitting, in response to receiving the request, the survey to the one or more user profiles;
receiving, from the one or more user profiles, first data indicative of one or more responses associated with the survey;
inputting the one or more responses into a machine-learning model trained to output second data consistent with a synthesized representation of the first data;
receiving, from the machine-learning model, the second data that is associated with the synthesized representation of the first data; and
causing, in response to receiving the second data from the machine-learning model, the second data to be displayed via a user interface of a user device of the user profile.

8. The one or more non-transitory computer-readable media of claim 7, wherein the user interface is an overlay user interface and a portion of the second data is displayed within the overlay user interface, the operations further comprising:
receiving, from the user profile, user input data indicative of a selection of the portion of the second data; and
causing, in response to the user input data, an entirety of the second data to be displayed via a second user interface of the communication platform.

9. The one or more non-transitory computer-readable media of claim 7, wherein the one or more user profiles are external to the communication platform.

10. The one or more non-transitory computer-readable media of claim 7, wherein the second data is at least one of:
a file,
a document,
a link, or
a second virtual space.

11. The one or more non-transitory computer-readable media of claim 7, wherein the user profile is a first user profile and the request is a first request, wherein inputting the one or more responses into the machine-learning model is based at least in part on:
receiving, from a second user profile, a second request to synthesize the one or more responses; and
inputting, in response to receiving the second request, the one or more responses into the machine-learning model.

12. The one or more non-transitory computer-readable media of claim 11, wherein receiving the second request comprises:
generating, based on input from the second user profile, a workflow configured to execute a process to synthesize the one or more responses; and
receiving, from the second user profile, user input data including one or more instructions to execute the workflow.

13. The one or more non-transitory computer-readable media of claim 12, wherein generating the workflow is based at least in part on:
receiving, from the second user profile, a first modular function configured retrieve content from a virtual space;
receiving, from the second user profile, a second modular function configured to input the content into a machine-learning model; and
receiving, from the second user profile, a third modular function configured to display an output of the machine-learning model to the user interface.

14. A method comprising:
receiving, from a user profile associated with a user of a communication platform, a request to send a survey to one or more user profiles;
transmitting, in response to receiving the request, the survey to the one or more user profiles;

receiving, from the one or more user profiles, first data indicative of one or more responses associated with the survey;

inputting the one or more responses into a machine-learning model trained to output second data consistent with a synthesized representation of the first data;

receiving, from the machine-learning model, the second data that is associated with the synthesized representation of the first data; and causing, in response to receiving the second data from the machine-learning model, the second data to be displayed via a user interface of a user device of the user profile.

15. The method of claim 14, wherein the user interface is an overlay user interface and a portion of the second data is displayed within the overlay user interface, further comprising:

receiving, from the user profile, user input data indicative of a selection of the portion of the second data; and causing, in response to the user input data, an entirety of the second data to be displayed via a second user interface of the communication platform.

16. The method of claim 14, wherein the one or more user profiles are external to the communication platform.

17. The method of claim 14, wherein the second data is at least one of:

a file, a document, a link, or a second virtual space.

18. The method of claim 14, wherein the user profile is a first user profile and the request is a first request, wherein inputting the one or more responses into the machine-learning model is based at least in part on:

receiving, from a second user profile, a second request to synthesize the one or more responses; and inputting, in response to receiving the second request, the one or more responses into the machine-learning model.

19. The method of claim 18, wherein receiving the second request comprises:

generating, based on input from the second user profile, a workflow configured to execute a process to synthesize the one or more responses; and receiving, from the second user profile, user input data including one or more instructions to execute the workflow.

20. The method of claim 19, wherein generating the workflow is based at least in part on:

receiving, from the second user profile, a first modular function configured retrieve content from a virtual space;

receiving, from the second user profile, a second modular function configured to input the content into a machine-learning model; and receiving, from the second user profile, a third modular function configured to display an output of the machine-learning model to the user interface.

* * * * *